US012070944B2

(12) United States Patent
Yamamoto et al.

(10) Patent No.: US 12,070,944 B2
(45) Date of Patent: Aug. 27, 2024

(54) LIQUID EJECTING SYSTEM

(71) Applicant: SEIKO EPSON CORPORATION, Tokyo (JP)

(72) Inventors: Takao Yamamoto, Matsumoto (JP); Shiki Kumagai, Shiojiri (JP); Shunya Fukuda, Azumino (JP); Nobuaki Ito, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 123 days.

(21) Appl. No.: 18/047,221

(22) Filed: Oct. 17, 2022

(65) Prior Publication Data

US 2023/0118256 A1 Apr. 20, 2023

(30) Foreign Application Priority Data

Oct. 18, 2021 (JP) ................................ 2021-170100

(51) Int. Cl.
*B41J 2/045* (2006.01)

(52) U.S. Cl.
CPC ....... *B41J 2/04588* (2013.01); *B41J 2/04563* (2013.01); *B41J 2/04581* (2013.01)

(58) Field of Classification Search
CPC ................ B41J 2/04588; B41J 2/04563; B41J 2/04581; B41J 2/04541; B41J 2/04553; B41J 2/04571; B41J 2002/14241; B41J 2002/14419; B41J 2/14233; B41J 2002/14491
See application file for complete search history.

(56) References Cited

U.S. PATENT DOCUMENTS

2021/0162744 A1 6/2021 Shimizu et al.

FOREIGN PATENT DOCUMENTS

JP 2021-084388 A 6/2021

*Primary Examiner* — Lisa Solomon
(74) *Attorney, Agent, or Firm* — WORKMAN NYDEGGER

(57) ABSTRACT

A liquid ejecting system includes a head unit that includes a nozzle for ejecting a liquid, a pressure chamber communicating with the nozzle, and a drive element for applying pressure fluctuation to a liquid in the pressure chamber by supplying a drive pulse, an acquisition portion that acquires output information regarding a usage condition of the head unit, a first connection portion that is communicably connected to a server through a network, a first output portion that outputs the output information through the first connection portion, a first input portion to which input information regarding a waveform of the drive pulse supplied to the drive element is input through the first connection portion. A decision portion that decides the waveform of the drive pulse supplied to the drive element based on the input information.

19 Claims, 18 Drawing Sheets

FIG. 7

| CORRESPONDENCE INFORMATION D4 | | | |
|---|---|---|---|
| HEAD TYPE | INK TYPE | TEMPERATURE | WAVEFORM |
| HEAD Ha | INK Ia | LOWER THAN 10°C | WAVEFORM Pa |
| | | 10°C OR HIGHER AND 30°C OR LOWER | WAVEFORM Pb |
| | | HIGHER THAN 30°C | WAVEFORM Pc |
| | INK Ib | LOWER THAN 10°C | WAVEFORM Pd |
| | | 10°C OR HIGHER AND 30°C OR LOWER | ⋮ |
| | | HIGHER THAN 30°C | |
| | INK Ic | LOWER THAN 10°C | WAVEFORM Pe |
| | | 10°C OR HIGHER AND 30°C OR LOWER | ⋮ |
| | | HIGHER THAN 30°C | |
| HEAD Hb | INK Ia | LOWER THAN 10°C | WAVEFORM Pf |
| | | 10°C OR HIGHER AND 30°C OR LOWER | |
| | | HIGHER THAN 30°C | |
| | INK Ib | LOWER THAN 10°C | |
| | | 10°C OR HIGHER AND 30°C OR LOWER | ⋮ |
| | | HIGHER THAN 30°C | |
| | INK Ic | LOWER THAN 10°C | |
| | | 10°C OR HIGHER AND 30°C OR LOWER | |
| | | HIGHER THAN 30°C | |
| HEAD Hc | INK Ia | LOWER THAN 10°C | WAVEFORM Pg |
| | | 10°C OR HIGHER AND 30°C OR LOWER | |
| | | HIGHER THAN 30°C | |
| | INK Ib | LOWER THAN 10°C | |
| | | 10°C OR HIGHER AND 30°C OR LOWER | ⋮ |
| | | HIGHER THAN 30°C | |
| | INK Ic | LOWER THAN 10°C | |
| | | 10°C OR HIGHER AND 30°C OR LOWER | |
| | | HIGHER THAN 30°C | |

LIQUID EJECTING SYSTEM

The present application is based on, and claims priority from JP Application Serial Number 2021-170100, filed Oct. 18, 2021, the disclosure of which is hereby incorporated by reference herein in its entirety.

BACKGROUND

1. Technical Field

The present disclosure relates to a liquid ejecting system.

2. Related Art

In a liquid ejecting apparatus such as an ink jet printer, generally, a liquid such as ink is ejected from a head by applying a drive pulse to a drive element such as a piezoelectric element. Here, for example, as disclosed in JP-A-2021-84388, in order to eject ink from the head with a desired ejection characteristic, it is necessary to appropriately set a waveform of the drive pulse.

In recent business models, the manufacturer of the printer main body, which is an element excluding the head among elements constituting a printer, may be different from the manufacturer of the head. In this case, usage conditions such as the type of ink and the usage temperature of the head differ depending on the printer manufacturer or user. For this reason, unlike when the manufacturer of the printer main body is the same as the manufacturer of the head, it is difficult for the manufacturer of the head to store information regarding an appropriate waveform of the drive pulse in the printer in advance. Therefore, it is necessary for the manufacturer or user of the printer main body to search for the waveform of the drive pulse according to usage conditions, and as a consequence, it is likely that the burden on the manufacturer or user of the printer main body is significantly increased.

SUMMARY

According to an aspect of the present disclosure, there is provided a liquid ejecting system including a head unit that includes a nozzle for ejecting a liquid, a pressure chamber communicating with the nozzle, and a drive element for applying pressure fluctuation to a liquid in the pressure chamber by supplying a drive pulse, an acquisition portion that acquires output information regarding a usage condition of the head unit, a first connection portion that is communicably connected to a server through a network, a first output portion that outputs the output information through the first connection portion, a first input portion to which input information regarding a waveform of the drive pulse supplied to the drive element is input through the first connection portion, and a decision portion that decides the waveform of the drive pulse supplied to the drive element based on the input information.

BRIEF DESCRIPTION OF THE DRAWINGS

FIG. 7 is a diagram showing an example of correspondence information.

DESCRIPTION OF EXEMPLARY EMBODIMENTS

Figure 1:
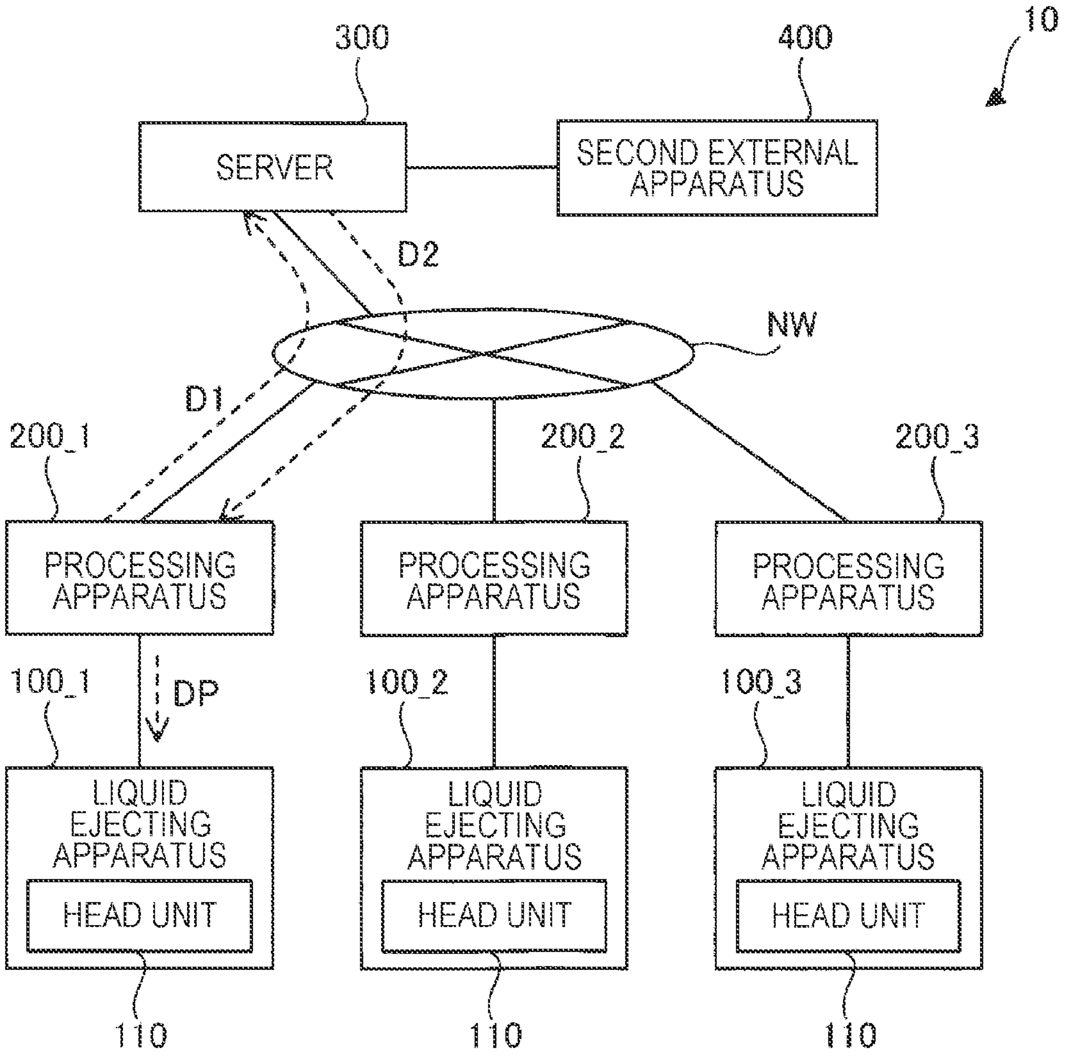
FIG. 1 is a schematic diagram showing a configuration example of a liquid ejecting system according to a first embodiment.

Hereinafter, preferred embodiments according to the present disclosure will be described with reference to the accompanying drawings. In the drawings, the dimensions and scale of each portion are appropriately different from the actual ones, and some portions are schematically shown for easy understanding. Further, the scope of the present disclosure is not limited to these forms unless it is stated in the following description that the present disclosure is particularly limited.

1. First Embodiment

1-1. Outline of Liquid Ejecting System

FIG. 1 is a schematic diagram showing a configuration example of a liquid ejecting system 10 according to a first embodiment. The liquid ejecting system 10 is a system that optimizes a waveform of a drive pulse used for printing by the ink jet method. In the example shown in FIG. 1, the liquid ejecting system 10 includes liquid ejecting apparatuses 100_1 to 100_3, processing apparatuses 200_1 to 200_3, a server 300, and a second external apparatus 400. Here, the liquid ejecting apparatuses 100_1 to 100_3 are provided by a manufacturer of a printer main body (described later). Each of the liquid ejecting apparatuses 100_1 to 100_3 may be provided by the same manufacturer or may be provided by different manufacturers. The processing apparatuses 200_1 to 200_3 may be owned by the user or may be provided by the manufacturer of the printer main body. On the other hand, head units 110 incorporated in the liquid ejecting apparatuses 100_1 to 100_3 are provided by the manufacturer of the head (described later). The server 300 is maintained and managed by a head manufacturer.

When a user uses the printer main body, the user owns the liquid ejecting apparatus 100_1, the processing apparatus 200_1, and the head unit 110. On the other hand, although the user does not own the server 300, the user can communicate (connected to) with the server 300 through a communication network NW (described later).

The user refers to a person who uses the liquid ejecting apparatus 100_1. For example, when the manufacturer of the printer main body, who purchases the head from the head manufacturer and manufactures the printer main body, uses the printer main body, the manufacturer of the printer main body is the user. Further, for example, when the manufacturer of the printer main body purchases the head from the head manufacturer and manufactures the printer main body, and a third party purchases and uses the printer main body from the manufacturer of the printer main body, the third party is the user.

The liquid ejecting apparatus 100_1 is communicably connected to the processing apparatus 200_1. The liquid ejecting apparatus 100_2 is communicably connected to the processing apparatus 200_2. The liquid ejecting apparatus 100_3 is communicably connected to the processing apparatus 200_3. As described above, the liquid ejecting apparatuses 100_1 to 100_3 correspond to the processing apparatuses 200_1 to 200_3, respectively, and are communicably connected to the processing apparatuses 200_1 to 200_3. In the following, without distinguishing each of the liquid ejecting apparatuses 100_1 to 100_3, they may be referred to as the liquid ejecting apparatus 100. Without distinguishing each of the processing apparatuses 200_1 to 200_3, they may be referred to as the processing apparatus 200.

In the example shown in FIG. 1, the number of each of the liquid ejecting apparatus 100 and the processing apparatus 200 included in the liquid ejecting system 10 is three, but the number is not limited thereto, and the number may be one, two, or four or more. That is, the number of sets of the liquid ejecting apparatus 100 and the processing apparatus 200 is not limited to three, and may be one, two, or four or more.

The liquid ejecting apparatus 100 is a printer that prints an image based on recorded data DP from the processing apparatus 200 on a print medium by an ink jet method. The recorded data DP is image data in a format that can be processed by the liquid ejecting apparatus 100. The print medium may be any medium as long as it can be printed by the liquid ejecting apparatus 100, and is not particularly limited, and is, for example, various papers, various cloths, various films, and the like. The liquid ejecting apparatus 100 may be a serial type printer or a line type printer.

The liquid ejecting apparatus 100 has the head unit 110. The head unit 110 is a module including an ink jet head. In the following, among the elements constituting the liquid ejecting apparatus 100, the elements other than the head unit 110 may be referred to as a "printer main body". Further, the head unit 110 may be simply referred to as a "head".

The processing apparatus 200 is a computer such as a desktop type or a laptop type, and has a function of generating the recorded data DP, a function of controlling printing by the liquid ejecting apparatus 100, and a function of deciding a waveform of a drive pulse PD used for the printing.

The processing apparatus 200 is communicably connected to the server 300 through the communication network NW including the Internet. The processing apparatus 200 outputs output information D1 to the server 300 and inputs input information D2 from the server 300. The output information D1 is information regarding a usage condition of the head unit 110. The input information D2 is information regarding a waveform of the drive pulse. The processing apparatus 200 decides the waveform of the drive pulse based on the input information D2. Further, the processing apparatus 200 generates the recorded data DP by performing various processing, such as raster image processor (RIP) processing or color conversion processing, on image data in the file format such as PostScript, a portable document format (PDF), and an XML paper specification (XPS).

The server 300 is a computer that functions as a cloud server, and has a function of inputting the output information D1 from the processing apparatus 200, a function of generating the input information D2 based on the output information D1, and a function of outputting the generated input information D2 to the processing apparatus 200. The server 300 is communicably connected to the second external apparatus 400, and appropriately transmits and receives information necessary for generating the input information D2.

The second external apparatus 400 is a computer that inputs the output information D1 from the server 300 as needed and outputs the information necessary for generating the input information D2 to the server 300.

In the liquid ejecting system 10 of the above outline, the processing apparatus 200 decides the waveform of the drive pulse based on the input information D2, and thus, even when the manufacturer of the printer main body is different from the manufacturer of the head, it is not necessary for the manufacturer or user of the printer main body to search for the waveform of the drive pulse PD according to the usage condition. Therefore, it is possible to reduce the burden on the manufacturer or user of the printer main body. Here, generating the input information D2 based on the output information D1 on the server 300 has an advantage that the input information D2 can be easily optimized as compared with the configuration in which the input information D2 is generated by the liquid ejecting apparatus 100. This advantage brings about the effect that the waveform of the drive pulse can be suitably decided by the liquid ejecting apparatus 100. Hereinafter, the liquid ejecting system 10 will be described in detail.

1-2. Configuration of Liquid Ejecting Apparatus

Figure 2:
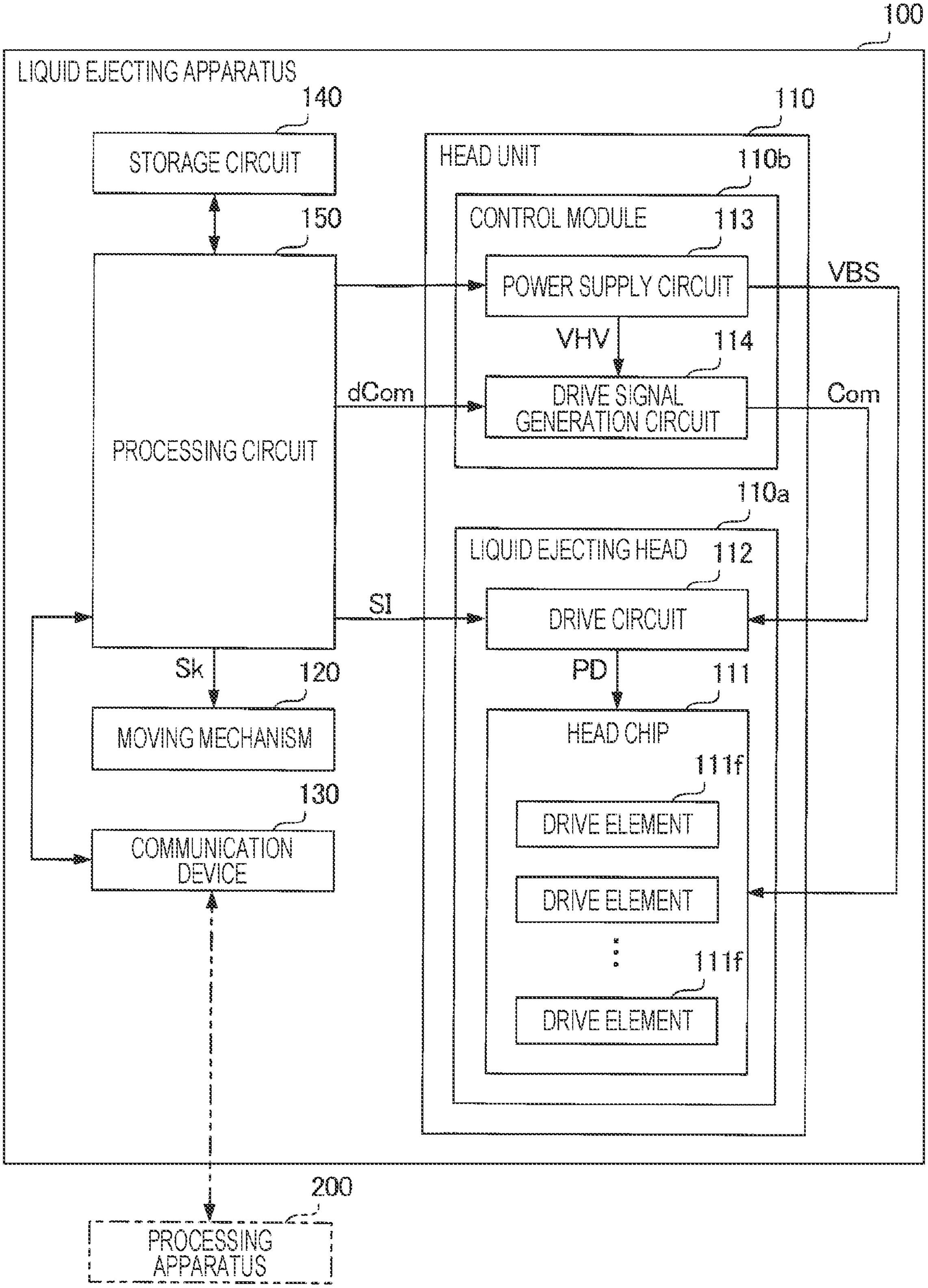
FIG. 2 is a schematic diagram showing a configuration example of a liquid ejecting apparatus used in the liquid ejecting system according to the first embodiment.

FIG. 2 is a schematic diagram showing a configuration example of the liquid ejecting apparatus 100 used in the liquid ejecting system 10 according to the first embodiment. As shown in FIG. 2, the liquid ejecting apparatus 100 includes the head unit 110, a moving mechanism 120, a communication device 130, a storage circuit 140, and a processing circuit 150.

The head unit 110 is an assembly including a head chip 111, a drive circuit 112, a power supply circuit 113, and a drive signal generation circuit 114.

In the example shown in FIG. 2, the head unit 110 is divided into the liquid ejecting head 110*a* including the head chip 111 and the drive circuit 112, and a control module 110*b* including the power supply circuit 113 and the drive signal generation circuit 114. The head unit 110 is not limited to the aspect of being divided into the liquid ejecting head 110*a* and the control module 110*b*, and for example, a part or all of the control module 110*b* may be incorporated in the liquid ejecting head 110*a*.

The head chip 111 ejects ink toward the print medium. In FIG. 2, among the components of the head chip 111, a plurality of drive elements 111*f* are typically shown. A detailed example of the head chip 111 will be described later with reference to FIG. 3.

In the example shown in FIG. 2, the head unit 110 has one head chip 111 in number, but the number may be two or more. When the liquid ejecting apparatus 100 is a serial type, one or more head chips 111 are arranged so that a plurality of nozzles are distributed over a part of the width direction of the print medium. Further, when the liquid ejecting apparatus 100 is a line type, two or more head chips 111 are arranged so that a plurality of nozzles are distributed over the entire width direction of the print medium.

The drive circuit 112 performs switching under the control of the processing circuit 150 as to whether or not to supply the drive signal Com output from the drive signal generation circuit 114 to each of the plurality of drive elements 111*f* of the head chip 111 as the drive pulse PD. The drive circuit 112 includes, for example, a group of switches such as a transmission gate for the switching.

The power supply circuit 113 receives electric power from a commercial power source (not shown) and generates various predetermined potentials. The various potentials generated are appropriately supplied to each portion of the liquid ejecting apparatus 100. In the example shown in FIG. 2, the power supply circuit 113 generates a power supply potential VHV and an offset potential VBS. The offset potential VBS is supplied to the head chip 111 and the like. Further, the power supply potential VHV is supplied to the drive signal generation circuit 114 and the like.

The drive signal generation circuit 114 is a circuit that generates a drive signal Com for driving each drive element 111*f* of the head chip 111. Specifically, the drive signal generation circuit 114 includes, for example, a digital-to-analog (DA) conversion circuit and an amplifier circuit. The drive signal generation circuit 114 generates the drive signal Com by the DA conversion circuit converting a waveform designation signal dCom described later from the processing circuit 150 from a digital signal to an analog signal, and the amplifier circuit amplifying the analog signal using the power supply potential VHV from the power supply circuit 113. Here, among the waveforms included in the drive signal Com, the signal of the waveform actually supplied to the drive element 111*f* is the drive pulse PD.

The moving mechanism 120 changes a relative position between the head unit 110 and the print medium. More specifically, when the liquid ejecting apparatus 100 is a serial type, the moving mechanism 120 includes a transport mechanism for transporting the print medium in a predetermined direction and a moving mechanism for repeatedly moving the head unit 110 along an axis orthogonal to the transport direction of the print medium. Further, when the liquid ejecting apparatus 100 is a line type, the moving mechanism 120 includes a transport mechanism for transporting the print medium in a direction intersecting a longitudinal direction of the elongated head unit 110.

The communication device 130 is a circuit capable of communicating with the processing apparatus 200. For example, the communication device 130 is an interface such as a wireless or wired local area network (LAN) or a universal serial bus (USB). USB is a registered trademark. The communication device 130 may be connected to another processing apparatus 200 through another network such as the Internet. Further, the communication device 130 may be integrated with the processing circuit 150.

The storage circuit 140 stores various programs executed by the processing circuit 150 and various data, such as the recorded data DP, processed by the processing circuit 150. The storage circuit 140 may include, for example, one or both semiconductor memories of one or more volatile memories such as random access memory (RAM) and one or more non-volatile memories such as read only memory (ROM), electrically erasable programmable read-only memory (EEPROM) or programmable ROM (PROM). The recorded data DP is supplied from, for example, the processing apparatus 200. The storage circuit 140 may be built as a part of the processing circuit 150.

The processing circuit 150 has a function of controlling the operation of each portion of the liquid ejecting apparatus 100 and a function of processing various data. The processing circuit 150 includes, for example, one or more processors such as a central processing unit (CPU). The processing circuit 150 may include a programmable logic device such as a field-programmable gate array (FPGA) in place of the CPU or in addition to the CPU.

The processing circuit 150 controls the operation of each portion of the liquid ejecting apparatus 100 by executing a program stored in the storage circuit 140. Here, the processing circuit 150 generates signals such as a control signal Sk, a print data signal SI, and the waveform designation signal dCom as signals for controlling the operation of each portion of the liquid ejecting apparatus 100.

The control signal Sk is a signal for controlling the drive of the moving mechanism 120. The print data signal SI is a signal for controlling the drive of the drive circuit 112. Specifically, the print data signal SI specifies whether the drive circuit 112 supplies the drive signal Com from the drive signal generation circuit 114 to the drive element 111*f* as a drive pulse PD, for each predetermined unit period. By the specifying, the amount of ink ejected from the head chip 111 and the like are specified. The waveform designation signal dCom is a digital signal for defining the waveform of the drive signal Com generated by the drive signal generation circuit 114.

Figure 3:
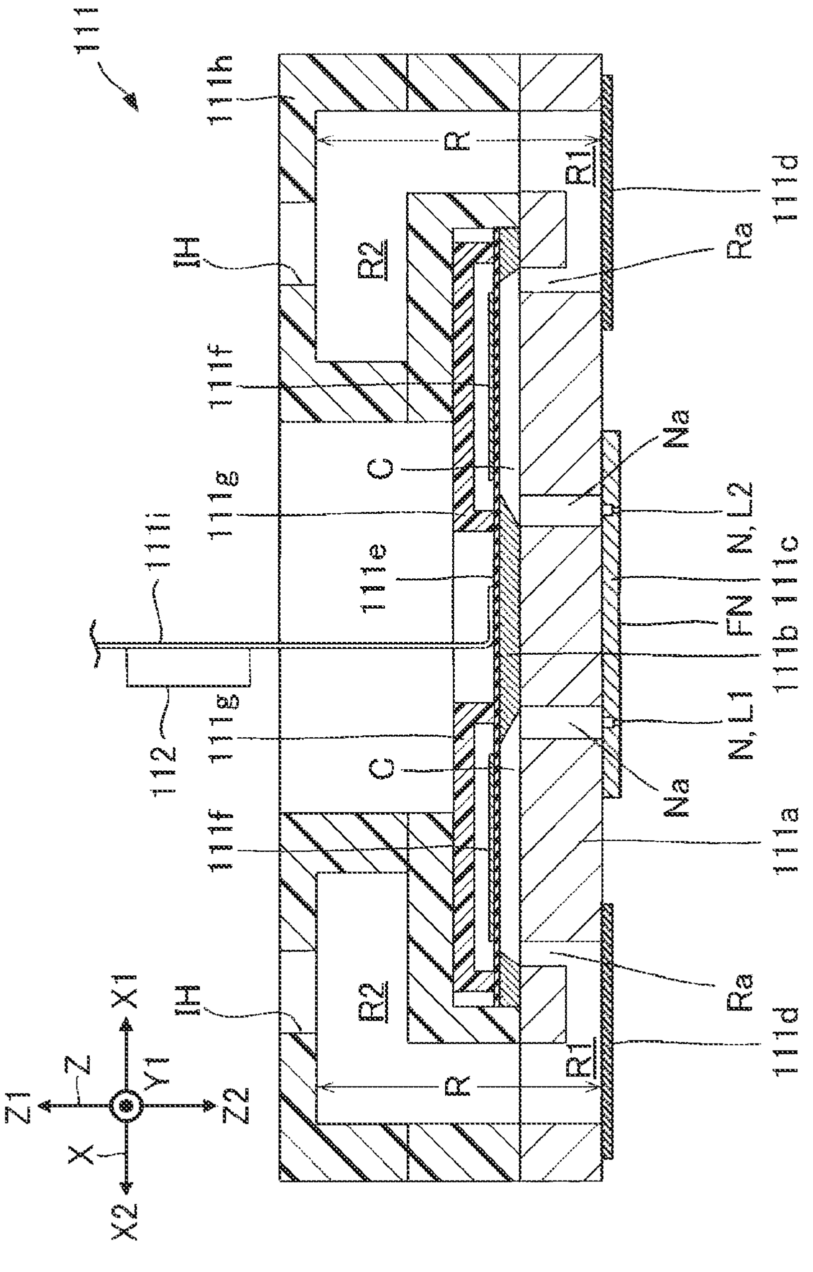
FIG. 3 is a cross-sectional view showing a configuration example of a head chip.

FIG. 3 is a cross-sectional view showing a configuration example of the head chip 111. In the following description, an X axis, a Y axis and a Z axis that intersect each other are appropriately used. In the following, one direction along the X axis is a X1 direction, and a direction opposite to the X1 direction is an X2 direction. Similarly, the directions opposite to each other along the Y axis are a Y1 direction and a Y2 direction. Opposite directions along the Z axis are a Z1 direction and a Z2 direction.

As shown in FIG. 3, the head chip 111 has a plurality of nozzles N arranged in a direction along the Y axis. The plurality of nozzles N are divided into a first row L1 and a second row L2 which are arranged at intervals in a direction along the X axis. Each of the first row L1 and the second row L2 is a set of a plurality of nozzles N linearly arranged in the direction along the Y axis.

The head chip 111 has a configuration substantially symmetrical with each other in the direction along the X axis. However, positions of the plurality of nozzles N in the first row L1 and the plurality of nozzles N in the second row L2 in the direction along the Y axis may match or differ from each other. FIG. 3 illustrates a configuration in which the positions of the plurality of nozzles N in the first row L1 and the plurality of nozzles N in the second row L2 in the direction along the Y axis match with each other.

As shown in FIG. 3, the head chip 111 includes a flow path substrates 111*a*, a pressure chamber substrate 111*b*, a nozzle plate 111*c*, vibration absorbing bodies 111*d*, a vibration plate 111*e*, a plurality of drive elements 111*f*, protective plates 111*g*, a case 111*h*, and a wiring substrate 111*i*.

The flow path substrate 111*a* and the pressure chamber substrate 111*b* are stacked in this order in the Z1 direction, and form a flow path for supplying ink to a plurality of nozzles N. The vibration plate 111*e*, the plurality of drive elements 111*f*, the protective plates 111*g*, the case 111*h*, and the wiring substrate 111*i* are installed in a region located in the Z1 direction with respect to the stack body formed by the flow path substrate 111*a* and the pressure chamber substrate 111*b*. On the other hand, the nozzle plate 111*c* and the vibration absorbing bodies 111*d* are installed in a region located in the Z2 direction with respect to the stack body. Each element of the head chip 111 is schematically a plate-shaped member elongated in the Y direction, and is joined to each other by, for example, an adhesive. Hereinafter, each element of the head chip 111 will be described in order.

The nozzle plate 111*c* is a plate-shaped member provided with a plurality of nozzles N in each of the first row L1 and the second row L2. Each of the plurality of nozzles N is a through hole through which ink is passed. Here, the surface of the nozzle plate 111*c* facing the Z2 direction is a nozzle surface FN. The nozzle plate 111*c* is manufactured by processing a silicon single crystal substrate by a semiconductor manufacturing technique using a processing technique such as dry etching or wet etching, for example. However, other known methods and materials may be appropriately used for manufacturing the nozzle plate 111*c*. Further, the cross-sectional shape of the nozzle is typically a circular shape, but the shape is not limited thereto, and may be a non-circular shape such as a polygon or an ellipse.

The flow path substrate 111*a* is provided with a space R1, a plurality of supply flow paths Ra, and a plurality of communication flow paths Na for each of the first row L1 and the second row L2. The space R1 is an elongated opening extending in the direction along the Y axis in a plan view in the direction along the Z axis. Each of the supply flow path Ra and the communication flow path Na is a through hole formed for each nozzle N. Each supply flow path Ra communicates with the space R1.

The pressure chamber substrate 111*b* is a plate-shaped member provided with a plurality of pressure chambers C referred to as cavities for each of the first row L1 and the second row L2. The plurality of pressure chambers C are arranged in the direction along the Y axis. Each pressure chamber C is an elongated space formed for each nozzle N and extending in the direction along the X axis in a plan view. Each of the flow path substrate 111*a* and the pressure chamber substrate 111*b* is manufactured by processing a silicon single crystal substrate by, for example, semiconductor manufacturing technique, in the same manner as the nozzle plate 111*c* described above. However, other known methods and materials may be appropriately used for the manufacturing of each of the flow path substrate 111*a* and the pressure chamber substrate 111*b*.

The pressure chamber C is a space located between the flow path substrate 111*a* and the vibration plate 111*e*. For each of the first row L1 and the second row L2, a plurality of the pressure chambers C are arranged in a direction along the Y axis. Further, the pressure chamber C communicates with each of the communication flow path Na and the supply flow path Ra. Therefore, the pressure chamber C communicates with the nozzle N through the communication flow path Na and communicates with the space R1 through the supply flow path Ra.

The vibration plate 111*e* is arranged on the surface of the pressure chamber substrate 111*b* facing the Z1 direction. The vibration plate 111*e* is a plate-shaped member that can elastically vibrate. The vibration plate 111*e* has, for example, a first layer and a second layer, which are stacked in the Z1 direction in this order. The first layer is, for example, an elastic film made of silicon oxide ($SiO_2$). The elastic film is formed, for example, by thermally oxidizing one surface of a silicon single crystal substrate. The second layer is, for example, an insulating film made of zirconium oxide ($ZrO_2$). The insulating film is formed by, for example, forming a zirconium layer by a sputtering method and thermally oxidizing the layer. The vibration plate 111*e* is not limited to the above-mentioned stacked configuration of the first layer and the second layer, and may be constituted by, for example, a single layer or three or more layers.

On the surface of the vibration plate 111*e* facing the Z1 direction, a plurality of drive elements 111*f* corresponding to the nozzles N are arranged for each of the first row L1 and the second row L2. Each drive element 111*f* is a passive element that is deformed by the supply of the drive signal. Each drive element 111*f* has an elongated shape extending in the direction along the X axis in a plan view. The plurality of drive elements 111*f* are arranged in the direction along the Y axis to correspond to the plurality of pressure chambers C. The drive element 111*f* overlaps the pressure chamber C in a plan view.

Each drive element 111*f* is a piezoelectric element, and although not shown, it has a first electrode, a piezoelectric layer, and a second electrode, which are stacked in the Z1 direction in this order. One of the first electrode and the second electrode is an individual electrode arranged apart from other first electrodes for each drive element 111*f*, and a drive pulse PD is supplied to the one electrode. The other electrode of the first electrode and the second electrode is a band-shaped common electrode extending in the direction along the Y axis to be continuous over the plurality of drive elements 111*f*, and the offset potential VBS is supplied to the other electrode. Examples of the metal material of the electrodes include metal materials such as platinum (Pt), aluminum (Al), nickel (Ni), gold (Au), and copper (Cu), and of the materials, one type can be used alone or two or more types can be used in combination in an alloyed or stacked manner. The piezoelectric layer is made of a piezoelectric material such as lead zirconate titanate ($Pb(Zr, Ti)O_3$), and has, for example, a band shape extending in the direction along the Y axis be continuous over the plurality of drive elements 111*f*. However, the piezoelectric layer may be integrated over the plurality of drive elements 111*f*. In this case, the piezoelectric layer is provided with a through hole penetrating the piezoelectric layer extending in the direction along the X axis in a region corresponding to the gap between the pressure chambers C adjacent to each other in a plan view. When the vibration plate 111*e* vibrates in conjunction with the above deformation of the drive elements 111*f*, the pressures in the pressure chambers C fluctuate, and ink is ejected from the nozzles N.

The protective plates 111*g* are a plate-shaped members installed on the surface of the vibration plate 111*e* facing the Z1 direction, and protect the plurality of drive elements 111*f* and reinforce the mechanical strength of the vibration plate 111*e*. Here, the plurality of drive elements 111*f* are accommodated between the protective plates 111_g_ and the vibration plate 111_e_. The protective plates 111_g_ are made of, for example, a resin material.

The case 111_h_ is a member for storing ink supplied to a plurality of pressure chambers C. The case 111_h_ is made of, for example, a resin material. The case 111_h_ is provided with a space R2 for each of the first row L1 and the second row L2. The space R2 is a space communicating with the above-mentioned space R1 and functions as a reservoir R for storing ink supplied to a plurality of pressure chambers C together with the space R1. The case 111_h_ is provided with an introduction port IH for supplying ink to each reservoir R. The ink in each reservoir R is supplied to the pressure chamber C through each supply flow path Ra.

The vibration absorbing body 111_d_, also referred to as a compliance substrate, is a flexible resin film constituting a wall surface of the reservoir R, and absorbs pressure fluctuations of ink in the reservoir R. The vibration absorbing body 111_d_ may be a thin plate made of metal and having flexibility. The surface of the vibration absorbing body 111_d_ facing the Z1 direction is joined to the flow path substrate 111_a_ with an adhesive or the like.

The wiring substrate 111_i_ is mounted on the surface of the vibration plate 111_e_ facing the Z1 direction, and is a mounting component for electrically coupling the head chip 111, the drive circuit 112, the control module 110_b_, and the like. The wiring substrate 111_i_ is a flexible wiring substrate such as a chip on film (COF), a flexible printed circuit (FPC) or a flexible flat cable (FFC). The drive circuit 112 described above is mounted on the wiring substrate 111_i_ of the present embodiment.

1-3. Configuration of Processing Apparatus

Figure 4:
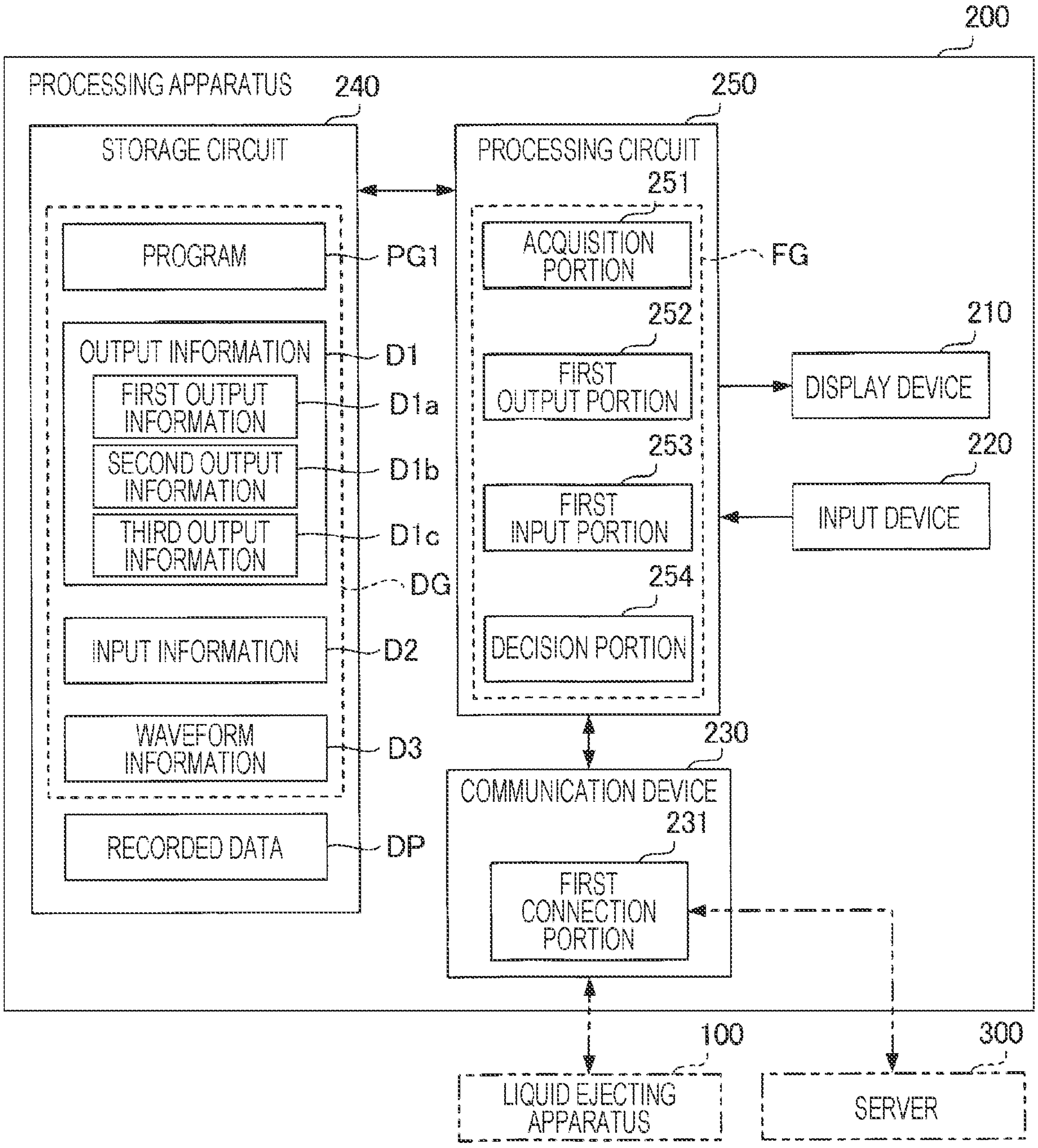
FIG. 4 is a schematic diagram showing a configuration example of a processing apparatus used in the liquid ejecting system according to the first embodiment.

FIG. 4 is a schematic diagram showing a configuration example of the processing apparatus 200 used in the liquid ejecting system 10 according to the first embodiment. As shown in FIG. 4, the processing apparatus 200 includes a display device 210, an input device 220, a communication device 230, a storage circuit 240, and a processing circuit 250. The components are communicably connected to each other.

The display device 210 displays various images under the control of the processing circuit 250. Here, the display device 210 includes various display panels such as a liquid crystal display panel or an organic electro-luminescence (EL) display panel, for example. The display device 210 may be provided outside the processing apparatus 200. Further, the display device 210 may be a component of the liquid ejecting apparatus 100.

The input device 220 is a device that receives operations from the user. For example, the input device 220 has a pointing device such as a touch pad, a touch panel or a mouse. Here, when the input device 220 has a touch panel, the input device 220 may also serve as a display device 210. The input device 220 may be provided outside the processing apparatus 200. Further, the input device 220 may be a component of the liquid ejecting apparatus 100. Further, the input device 220 may include an image capturing device having a charge coupled device (CCD) image sensor, a complementary MOS (CMOS) image sensor, or the like.

The communication device 230 is a circuit capable of communicating with each of the liquid ejecting apparatus 100 and the server 300. For example, the communication device 230 is an interface such as a wireless or wired LAN or USB. The communication device 230 transmits the recorded data DP to the liquid ejecting apparatus 100 by communicating with the liquid ejecting apparatus 100. Further, the communication device 230 transmits the output information D1 and receives the input information D2 by communicating with the server 300. That is, the communication device 230 functions as a first connection portion 231 that is communicably connected to the server 300 through the network. The communication device 230 may be integrated with the processing circuit 250.

The storage circuit 240 is a device that stores various programs executed by the processing circuit 250 and various data processed by the processing circuit 250. The storage circuit 240 has, for example, a hard disk drive or a semiconductor memory. A part or all of the storage circuit 240 may be provided in a storage device or a server outside the processing apparatus 200.

The storage circuit 240 of the present embodiment stores a program PG1, the output information D1, the input information D2, the waveform information D3, and the recorded data DP. Some or all of the program PG1, the output information D1, the input information D2, and the waveform information D3 may be stored in a storage device or server outside the processing apparatus 200. Further, in the following, the program PG1, the output information D1 and the input information D2 may be collectively referred to as information DG.

The program PG1 is a program that causes a computer to implement various functions necessary for deciding the waveform of the drive pulse PD based on the input information D2.

The output information D1 is information regarding a usage condition of the head unit 110. The usage condition is a condition that among conditions related to the usage environment of the head unit 110, can affect the ejection characteristics of the head unit 110.

In the example shown in FIG. 4, the output information D1 includes first output information D1_a_, second output information D1_b_, and third output information D1_c_. The first output information D1_a_ is information regarding the type of the head unit 110. More specifically, the first output information D1_a_ is identification information such as a serial number unique to the head unit 110. The second output information D1_b_ is information regarding the type of liquid used for ejection in the head unit 110. For example, the second output information D1_b_ is information regarding the product number, viscosity, residual vibration, ejection speed, and the like of the ink. The third output information D1_c_ is information regarding the temperature of the head unit 110. For example, the third output information D1_c_ is information regarding the temperature in the installation environment of the head unit 110, or information regarding the detection temperature of a temperature sensor provided in or around the head unit 110.

The input information D2 is information regarding the waveform of the drive pulse PD supplied to the drive element 111_f_. The input information D2 is provided from the server 300 to the processing apparatus 200 as described above. The waveform information D3 is information regarding a waveform generated based on the input information D2. The waveform information D3 is used, for example, to generate the waveform designation signal dCom in the above-mentioned processing circuit 150. The details of the waveform of the drive pulse PD will be described later with reference to FIG. 8.

The processing circuit 250 is a device having a function of controlling each portion of the processing apparatus 200 and a function of processing various data. The processing circuit 250 has, for example, a processor such as a central processing unit (CPU). The processing circuit 250 may be constituted by a single processor or may be constituted by a plurality of processors. In addition, some or all of the functions of the processing circuit 250 are implemented by hardware such as a digital signal processor (DSP), an application specific integrated circuit (ASIC), a programmable logic device (PLD), a field programmable gate array (FPGA).

The processing circuit 250 functions as an acquisition portion 251, a first output portion 252, a first input portion 253, and a decision portion 254 by reading the program PG1 from the storage circuit 240 and executing the program PG1. In the following, the acquisition portion 251, the first output portion 252, the first input portion 253, and the decision portion 254 may be collectively referred to as a function FG.

The acquisition portion 251 acquires the output information D1. For example, the acquisition portion 251 acquires the output information D1 by the input to the input device 220 by the user of the liquid ejecting apparatus 100. The acquired output information D1 is stored in the storage circuit 240 as described above.

The first output portion 252 outputs the output information D1 through the first connection portion 231. For example, the first output portion 252 outputs the output information D1 to the server 300 through the first connection portion 231 by using an instruction or the like issued by a user using the input device 220 as a trigger.

The input information D2 is input to the first input portion 253 through the first connection portion 231. For example, the input information D2 is input from the server 300 to the first input portion 253 through the first connection portion 231, by using an instruction or the like issued by the user using the input device 220 as a trigger.

The decision portion 254 decides the waveform of the drive pulse PD based on the input information D2. Here, the decision portion 254 stores the information regarding the decided waveform in the storage circuit 240 as the waveform information D3.

1-4. Configuration of Server

Figure 5:
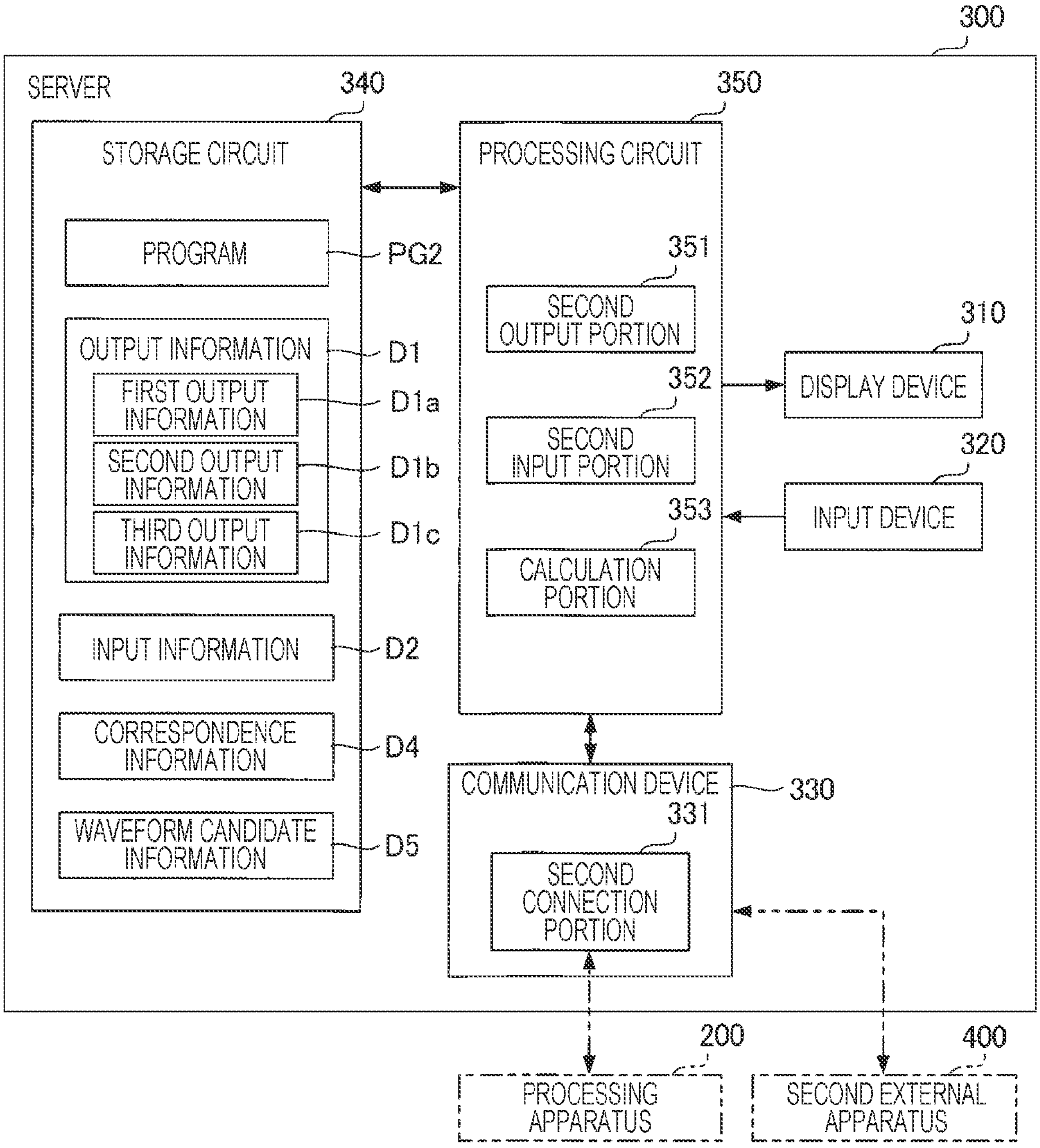
FIG. 5 is a schematic diagram showing a configuration example of a server used in the liquid ejecting system according to the first embodiment.

FIG. 5 is a schematic diagram showing a configuration example of the server 300 used in the liquid ejecting system 10 according to the first embodiment. As shown in FIG. 5, the server 300 includes a display device 310, an input device 320, a communication device 330, a storage circuit 340, and a processing circuit 350. The components are communicably connected to each other. The storage circuit 340 is an example of a "storage portion".

The display device 310 is a device that displays various images under the control of the processing circuit 350, and is configured in the same manner as the display device 210 described above. The input device 320 is a device that receives an operation from the user, and is configured in the same manner as the input device 220 described above. The communication device 330 is a circuit capable of communicating with each processing apparatus 200, and is configured in the same manner as the communication device 230 as described above. The communication device 330 may be integrated with the processing circuit 350.

Here, the communication device 330 receives the output information D1 and transmits the input information D2 by communicating with the processing apparatus 200. That is, the communication device 330 functions as a second connection portion 331 that is communicably connected to the first connection portion 231. Further, the communication device 330 transmits the output information D1 and receives waveform candidate information D5 by communicating with the second external apparatus 400, as needed.

The storage circuit 340 is a device that stores various programs executed by the processing circuit 350 and various data processed by the processing circuit 350, and is configured in the same manner as the storage circuit 240 described above. The storage circuit 340 stores the program PG2, the output information D1, the input information D2, the correspondence information D4, and the waveform candidate information D5.

The program PG2 is a program that enables a computer to implement various functions necessary for generating input information D2 based on output information D1. The correspondence information D4 is information regarding the correspondence relationship between usage conditions of the head unit 110 and waveforms of the drive pulse PD to be supplied to the drive element 111*f*. The details of the correspondence information D4 will be described later with reference to FIG. 7.

The waveform candidate information D5 is information regarding a waveform candidate different from the waveforms indicated by the correspondence information D4 before the generation of the waveform candidate information D5.

The processing circuit 350 is a device having a function of controlling each portion of the server 300 and a function of processing various data, and is configured in the same manner as the processing circuit 250 described above. The processing circuit 350 functions as a second output portion 351, a second input portion 352, and a calculation portion 353 by reading the program PG2 from the storage circuit 340 and executing the program PG2.

The second output portion 351 outputs the input information D2 through the second connection portion 331. For example, the second output portion 351 outputs the input information D2 to the processing apparatus 200 through the second connection portion 331, by using an instruction or the like issued by the user using the input device 220 as a trigger.

The output information D1 is input to the second input portion 352 through the second connection portion 331. For example, the output information D1 is input from the processing apparatus 200 to the second input portion 352 through the second connection portion 331, by using an instruction or the like by the user using the input device 220 as a trigger.

The calculation portion 353 performs a calculation for generating the input information D2 based on the output information D1. In the present embodiment, the calculation portion 353 generates the input information D2 based on the output information D1 and the correspondence information D4. Further, the calculation portion 353 generates the input information D2 by using the waveform candidate information D5 from the second external apparatus 400 without using the correspondence information D4, depending on a collation result between the output information D1 and the correspondence information D4.

More specifically, when the usage condition indicated by the output information D1 is included in the usage conditions indicated by the correspondence information D4, the calculation portion 353 generates the input information D2 so that among the usage conditions indicated by the correspondence information D4, a waveform corresponding to a usage condition matching the usage condition indicated by the output information D1 becomes the waveform indicated by the input information D2.

Further, when the usage condition indicated by the output information D1 is not included in the usage conditions indicated by the correspondence information D4, the calculation portion 353 generates the input information D2 so that among the usage conditions indicated by the correspondence information D4, a waveform corresponding to a usage condition closest to the usage condition indicated by the output information D1 becomes the waveform indicated by the input information D2.

Here, when the difference between the closest usage condition and the usage condition indicated by the output information D1 is more than a predetermined value, or when it is difficult to extract the closest usage condition from the usage conditions indicated by the correspondence information D4, it is difficult to generate appropriate input information D2. Therefore, in this case, the calculation portion 353 outputs the output information D1 to the second external apparatus 400, and then receives the input of the waveform candidate information D5. Then, the calculation portion 353 generates the input information D2 so that the waveform indicated by the waveform candidate information D5 becomes the waveform indicated by the input information D2.

Further, when the input of the waveform candidate information D5 is received, the calculation portion 353 adds information regarding the correspondence relationship between the usage condition indicated by the output information D1 and the waveform indicated by the waveform candidate information D5 to the correspondence information D4 and stores the added information in the storage circuit 340.

1-5. Process of Liquid Ejecting System

Figure 6:
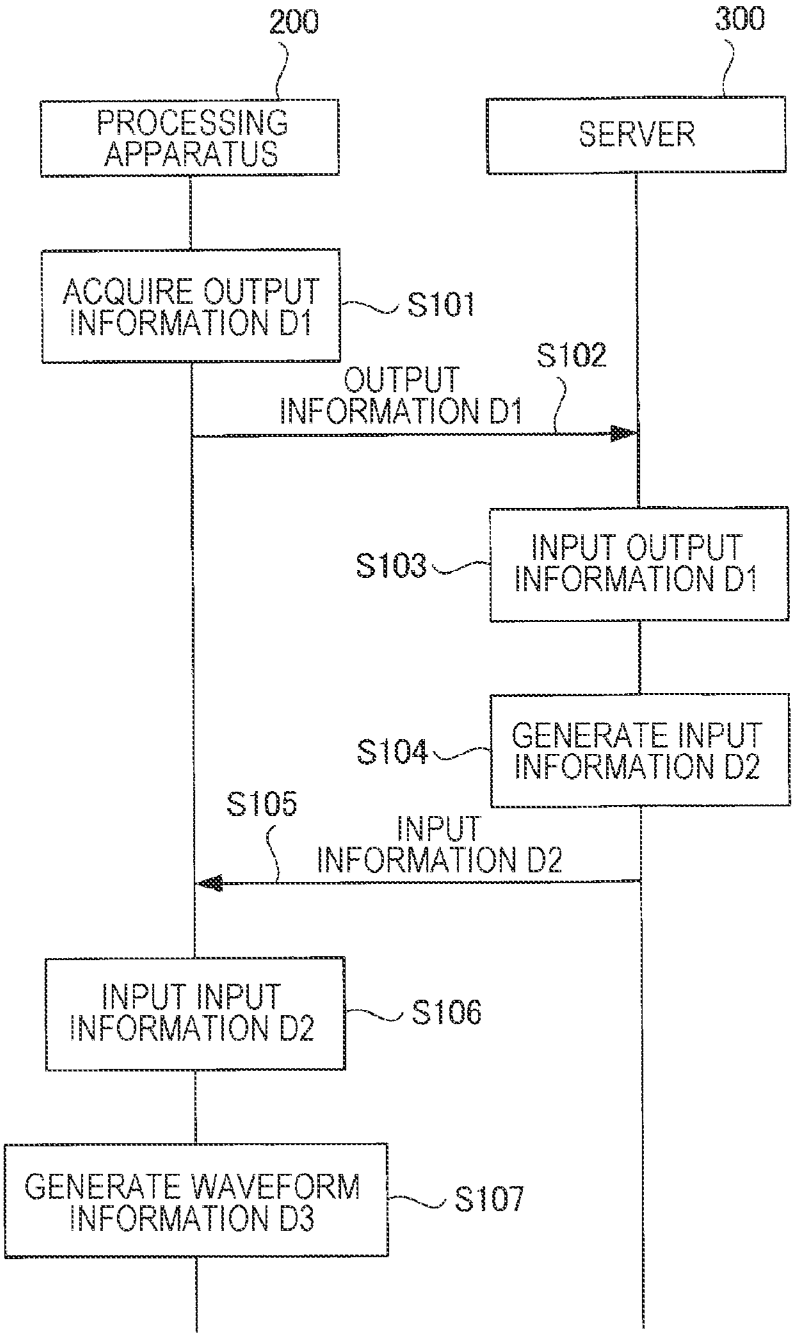
FIG. 6 is a flowchart showing a process of the liquid ejecting system according to the first embodiment.

FIG. 6 is a flowchart showing a process of the liquid ejecting system 10 according to the first embodiment. In the liquid ejecting system 10, first, as shown in FIG. 6, in step S101, the processing apparatus 200 acquires the output information D1.

Specifically, in step S101, the acquisition portion 251 may acquire the output information D1, for example, by displaying an image for a graphical user interface (GUI) for inputting information necessary for acquiring the output information D1 on the display device 210, and using the image to receive information necessary for acquiring the output information D1 from the user. The input of information necessary for the acquisition portion 251 acquiring the output information D1 is not limited to the method using the image, and for example, it may be performed by a method by automatically reading information such as a serial number stored in a memory (not shown) of the head unit 110 or the liquid ejecting head 110*a*, or by a method of using an output of a sensor (not shown) provided on the head unit 110. Examples of the sensor include a temperature sensor that detects the temperature of the head unit 110, a sensor that detects the viscosity or surface tension of ink, and the like.

Then, in step S102, the processing apparatus 200 outputs the output information D1 to the server 300.

Specifically, in step 102, the first output portion 252 outputs the output information D1 through the first connection portion 231, by using reception of the input using the above-mentioned GUI image as a trigger. Timing of outputting the output information D1 to the first connection portion 231 is not limited to the time when the input using the image for GUI is received. For example, the first output portion 252 may transmit authentication information such as account information and a password for the user to the server 300 when the input using the above-mentioned image for the GUI is received, the server 300 may transmit output permission information to the processing apparatus 200 when the server 300 succeeds in the authentication using the authentication information, and the first output portion 252 may output the output information D1 to the server 300 when the output permission information is received by the processing apparatus 200.

Next, in step S103, the server 300 inputs the output information D1. Then, in step S104, the server 300 generates the input information D2 based on the output information D1. Then, in step S105, the server 300 outputs the input information D2 to the processing apparatus 200.

Next, in step S106, the processing apparatus 200 inputs the input information D2. Specifically, in step S106, the input information D2 from the server 300 is input to the first input portion 253 through the first connection portion 231. The first input portion 253 may notify the user of whether or not the input information D2 is input from the server 300 by using the display device 210 or the like, and the input information D2 from the server 300 may be input only when the user inputs an instruction to permit input by the input device 220 or the like.

Then, in step S107, the processing apparatus 200 generates the waveform information D3 based on the input information D2. Specifically, in step S107, the decision portion 254 decides, for example, the waveform indicated by the input information D2 as it is, as the waveform of the drive pulse PD to be actually used. The decision portion 254 may fine-tune the waveform indicated by the input information D2 by user input using the input device 220, and then decide the fine-tuned waveform as the waveform of the drive pulse PD to be actually used. Alternatively, even when the decision portion 254 first decides the waveform indicated by the input information D2 as it is, as the waveform of the drive pulse PD to be actually used, the decision portion 254 may adjust the waveform of the drive pulse PD to increase the amplitude of the drive pulse PD when a usage period based on the number of times of ink ejection from the head unit 110 or the like is equal to or higher than a threshold value.

1-6. Process in Calculation Portion

As described above, the calculation portion 353 generates the input information D2 based on the output information D1 and the correspondence information D4. Hereinafter, an example of the correspondence information D4 will be described with reference to FIG. 7.

FIG. 7 is a diagram showing an example of the correspondence information D4. The correspondence information D4 shown in FIG. 7 shows the correspondence relationship between the head type, the ink type, the temperature, and the waveform. Here, the head type, the ink type, and the temperature shown in FIG. 7 are the usage conditions of the head unit 110. The waveforms shown in FIG. 7 are the waveforms of the drive pulse PD.

In FIG. 7, corresponding waveforms Pa, Pb, Pc, Pd, Pe, Pf, Pg, and the like are described for each combination of a head Ha, a head Hb, and a head Hc, which indicate the head type, an ink Ia, an ink Ib, and an ink Ic, which indicate the ink type, and less than 10° C., 10° C. or higher and 30° C. or lower, and higher than 30° C., which indicate the temperature. The correspondence information D4 shown in FIG. 7 is simplified for convenience of description, and the number of combinations of the usage conditions and the waveforms shown in the correspondence information D4 is not limited to the example shown in FIG. 7. For example, the number of each of the head type and the ink type may be two or less or four or more. Further, the number of temperature divisions is not limited to three divisions, and may be two divisions or less or four divisions or more.

For example, when the usage condition indicated by the output information D1 is a combination of the head Ha, the ink Ia, and the temperature of lower than 10° C., a waveform Pa is selected as the waveform indicated by the input information D2. When the usage condition indicated by the output information D1 is a combination of the head Ha, the ink Ia, and the temperature of 10° C. or higher and 30° C. or lower, a waveform Pb is selected as the waveform indicated by the input information D2. When the usage conditions indicated by the output information D1 are a combination of head Ha, ink Ia, and the temperature exceeding 30° C., a waveform Pc is selected as the waveform indicated by the input information D2.

Here, in general, the lower the usage temperature of the head unit 110, the higher the viscosity of the ink, and thus ink tends to be difficult to be ejected from the head unit 110. Therefore, the waveforms Pa, Pb, and Pc are set so as to reduce the tendency.

Further, for example, when the usage condition indicated by the output information D1 is a combination of the head Ha, the ink Ib, and the temperature of lower than 10° C., a waveform Pd is selected as the waveform indicated by the input information D2. When the usage condition indicated by the output information D1 is a combination of the head Ha, the ink Ic, and the temperature of lower than 10° C., a waveform Pe is selected as the waveform indicated by the input information D2.

Here, in general, the ejection characteristics of the head unit 110 change depending on the type of ink. Therefore, the waveforms Pa, Pd, and Pe are different from each other.

Further, for example, when the usage condition indicated by the output information D1 is a combination of the head Hb, the ink Ia, and the temperature of lower than 10° C., a waveform Pf is selected as the waveform indicated by the input information D2. When the usage condition indicated by the output information D1 is a combination of the head Hc, the ink Ia, and the temperature of lower than 10° C., a waveform Pg is selected as the waveform indicated by the input information D2.

Here, in general, the ejection characteristics of the head unit 110 change depending on the type of the head. Therefore, the waveforms Pa, Pf, and Pg are different from each other.

Figure 8:
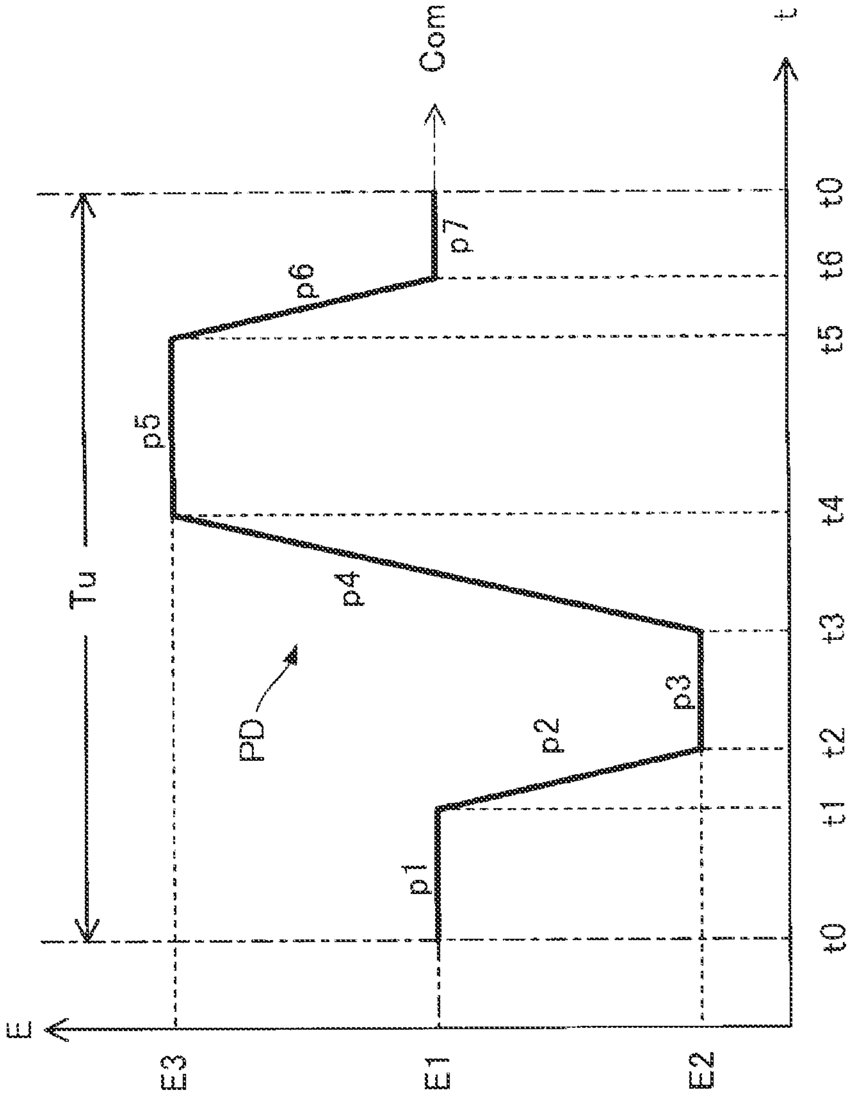
FIG. 8 is a diagram showing an example of a waveform of a drive pulse.

FIG. 8 is a diagram showing an example of the waveform of the drive pulse PD. FIG. 8 shows a change over time in a potential of the drive pulse PD, that is, a voltage waveform of the drive pulse PD. The waveform of the drive pulse PD is not limited to the example shown in FIG. 8, and any waveform is possible.

As shown in FIG. 8, the drive pulse PD is included in the drive signal Com for each unit period Tu. In the example shown in FIG. 8, a potential E of the drive pulse PD drops from potential E1, which is a reference potential, to a potential E2, rises to a potential E3 lower than the potential E1, and then returns to the potential E1.

More specifically, the potential E of the drive pulse PD is first maintained at the potential E1 over the period from a timing t0 to a timing t1, and then drops to the potential E2 over the period from the timing t1 to a timing t2. Then, the potential E of the drive pulse PD is maintained at the potential E2 over a period from the timing t2 to a timing t3, and then rises to the potential E3 over a period from the timing t3 to a timing t4. Then, it is maintained at the potential E3 over a period from the timing t4 to a timing t5, and then drops to the potential E1 over a period from the timing t5 to a timing t6.

The drive pulse PD having such a waveform increases the pressure chamber C in the period from timing t1 to timing t2, and sharply decreases the volume of the pressure chamber C in the period from timing t3 to timing t4. Due to such a change in the volume of the pressure chamber C, a part of the ink in the pressure chamber C is ejected as droplets from the nozzle.

The waveform of the drive pulse PD as described above can be represented by a function using the parameters p1, p2, p3, p4, p5, p6, and p7 corresponding to the above-mentioned periods, respectively. When the waveform of the drive pulse PD is defined by the function, the waveform of the drive pulse PD can be adjusted by changing each of the parameters. By adjusting the waveform of the drive pulse PD, the ink ejection characteristics from the head unit 110 can be adjusted.

For example, the ejection amount from the nozzle N can be reduced by reducing the difference between the potential E2 and the potential E3 or reducing the potential E3. Further, the ejection amount from the nozzle N can be reduced by lengthening the period from the timing t3 to the timing t4. Therefore, for example, the difference between the potential E2 and the potential E3 in the waveform Pb shown in FIG. 7 is smaller than the difference between the potential E2 and the potential E3 in the waveform Pa. Further, the difference between the potential E2 and the potential E3 in the waveform Pc is smaller than the difference between the potential E2 and the potential E3 in the waveform Pb.

Alternatively, the period from timing t3 to timing t4 in the waveform Pb may be longer than the period from timing t3 to timing t4 in the waveform Pa. Further, the period from timing t3 to timing t4 in the waveform Pc may be longer than the period from timing t3 to timing t4 in the waveform Pb.

Figure 9:
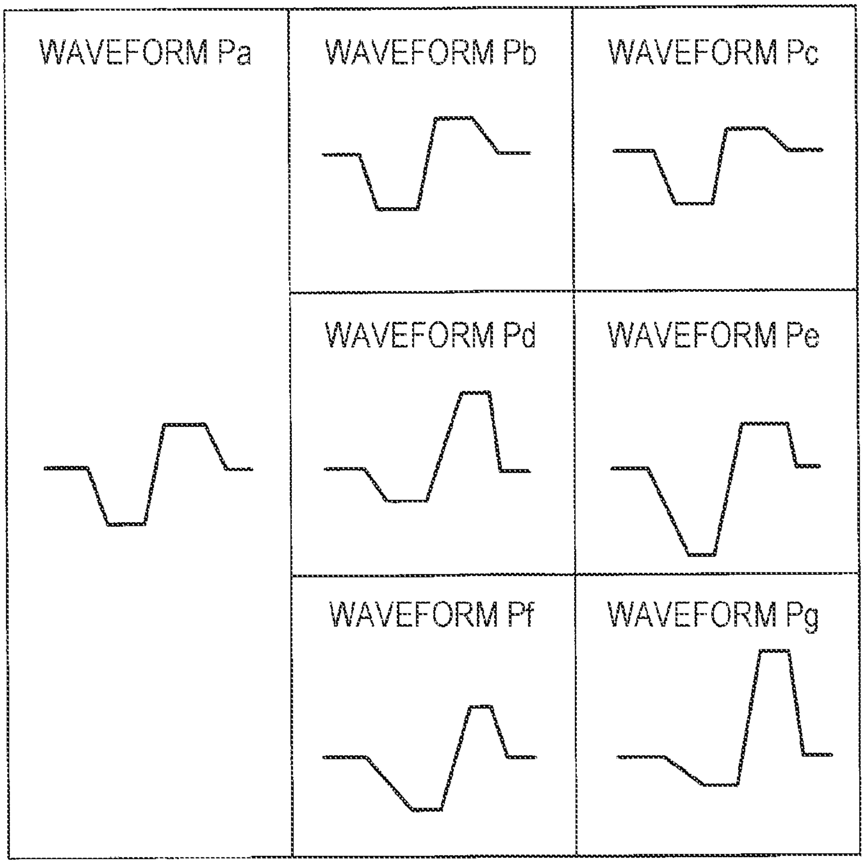
FIG. 9 is a diagram showing an example of waveforms indicated by the correspondence information.

FIG. 9 is a diagram showing an example of the waveforms Pa, Pb, Pc, Pd, Pe, Pf, and Pg indicated by the correspondence information D4. The waveforms Pa, Pb, Pc, Pd, Pe, Pf, and Pg are different from each other, for example, as shown in FIG. 9. As described above, in the waveform Pb shown in FIG. 9, the absolute value of the potential E2 is relatively large as compared to the waveform Pa, and the absolute value of the potential E3 is relatively small as compared to the waveform Pa, and thus the difference between the potential E2 and the potential E3 is relatively small as compared to the waveform Pa. In the waveform Pc, the absolute value of the potential E2 is relatively large as compared to the waveform Pb, and the absolute value of the potential E3 is relatively small as compared to the waveform Pb, and thus the difference between the potential E2 and the potential E3 is relatively small as compared to the waveform Pb.

The relationship between the waveforms Pa, Pb, and Pc shown in FIG. 9 is an example, and is not limited thereto. For example, in the waveforms Pa, Pb, and Pc, at least one of the period from the reference potential to the potential E2, the period in which the potential E2 is maintained, the period from the potential E2 to the potential E3, the period in which the potential E3 is maintained, and the period from the potential E3 to the reference potential may be different from the others.

Each of the waveforms Pd and Pe is different from the waveform Pa. As described above, the relationship between the waveforms Pa, Pd, and Pe is determined according to the type of ink, and is not limited to the example shown in FIG. 9.

Each of the waveforms Pf and Pg is different from the waveform Pa. As described above, the relationship between the waveforms Pa, Pf, and Pg is determined according to the type of the head, and is not limited to the example shown in FIG. 9.

1-7. Summary of First Embodiment

As described above, the liquid ejecting system 10 includes the head unit 110, the acquisition portion 251, the first connection portion 231, the first output portion 252, the first input portion 253, and the decision portion 254.

Here, the head unit 110 includes the nozzle N that ejects ink, which is an example of "liquid", the pressure chamber C communicating with the nozzle N, and the drive element **111*f* that gives a pressure fluctuation to the ink in the pressure chamber C by supplying the drive pulse PD. The acquisition portion 251 acquires the output information D1 regarding the usage condition of the head unit 110. The first connection portion 231 is communicably connected with the server 300 through a network. The first output portion 252 outputs the output information D1 through the first connection portion 231. Input information D2 regarding the waveform of the drive pulse PD supplied to the drive element 111*f* is input to the first input portion 253 through the first connection portion 231. The decision portion 254 decides the waveform of the drive pulse PD supplied to the drive element 111*f* based on the input information D2**.

In the above liquid ejecting system 10, the decision portion 254 decides the waveform of the drive pulse PD based on the input information D2, and thus, even when the manufacturer of the printer main body is different from the manufacturer of the head, it is not necessary for the manufacturer or user of the printer main body to search for the waveform of the drive pulse PD according to the usage condition. Therefore, it is possible to reduce the burden on the manufacturer or user of the printer main body. Here, the first connection portion 231 is communicably connected to the server 300 through the network, and the first output portion 252 outputs the output information D1 through the first connection portion 231, which makes it possible to input the output information D1 into the server 300. Therefore, the server 300 can generate the input information D2 based on the output information D1. The configuration in which the input information D2 is generated by the server 300 has an advantage that the input information D2 can be easily optimized as compared with the configuration in which the input information D2 is generated by a device such as the printer equipped with the head unit 110. Moreover, since the input information D2 is input to the first input portion 253 through the first connection portion 231, the input information D2 generated by the server 300 can be used to decide the waveform by the decision portion 254.

As described above, the liquid ejecting system 10 includes the liquid ejecting apparatus 100, the processing apparatus 200, and the server 300. Here, the liquid ejecting apparatus 100 includes the head unit 110. The processing apparatus 200 is communicably connected to the liquid ejecting apparatus 100 and generates the recorded data DP used for the liquid ejecting apparatus 100. Therefore, printing based on the recorded data DP from the processing apparatus 200 can be performed by the liquid ejecting apparatus 100. Further, various information can be communicated between the liquid ejecting apparatus 100 and the processing apparatus 200.

Each of the first input portion 253 and the first connection portion 231 is provided in the processing apparatus 200 as described above. Therefore, the input information D2 from the server 300 can be input to the processing apparatus 200. Therefore, by providing the decision portion 254 in the processing apparatus 200, the waveform information D3 regarding or the information based on the waveform decided by the decision portion 254 can be input from the processing apparatus 200 to the liquid ejecting apparatus 100.

As described above, the server 300 includes the second connection portion 331, the second input portion 352, the second output portion 351, and the calculation portion 353. Here, the second connection portion 331 is communicably connected to the first connection portion 231. The output information D1 is input to the second input portion 352 through the second connection portion 331. The second output portion 351 outputs the input information D2 through the second connection portion 331. The calculation portion 353 performs a calculation for generating the input information D2 based on the output information D1. In such a server 300, the output information D1 from the first connection portion 231 can be input to the server 300. Further, the input information D2 generated by the server 300 can be input to the first connection portion 231.

Further, as described above, the server 300 further includes the storage circuit 340 which is an example of the "storage portion". The storage circuit 340 stores the correspondence information D4 regarding the correspondence relationship between the usage conditions of the head unit 110 and the waveforms of the drive pulse PD to be supplied to the drive element **111*f*. Then, the calculation portion 353 generates the input information D2 based on the output information D1 and the correspondence information D4. Therefore, the calculation required for the generation of the input information D2 in the calculation portion 353 can be simplified as compared with the case where the input information D2** is generated by using the calculation such as a simulation.

As described above, when the usage condition indicated by the output information D1 is included in the usage conditions indicated by the correspondence information D4, the calculation portion 353 generates the input information D2 so that among the usage conditions indicated by the correspondence information D4, a waveform corresponding to a usage condition matching the usage condition indicated by the output information D1 becomes the waveform indicated by the input information D2. Therefore, it is possible to generate the input information D2 indicating the waveform information suitable for the usage condition of the head unit 110.

Further, as described above, when the usage condition indicated by the output information D1 is not included in the usage conditions indicated by the correspondence information D4, the calculation portion 353 generates the input information D2 so that among the usage conditions indicated by the correspondence information D4, a waveform corresponding to a usage condition closest to the usage condition indicated by the output information D1 becomes the waveform indicated by the input information D2. Therefore, even when the amount of information of the correspondence information D4 is reduced, it is possible to generate the input information D2 indicating the waveform information suitable for the usage condition of the head unit 110.

Further, as described above, when the usage condition indicated by the output information D1 is not included in the usage conditions indicated by the correspondence information D4, the calculation portion 353 outputs the output information D1 to the second external apparatus 400. Then, the calculation portion 353 receives the input of the waveform candidate information D5 regarding the waveform candidates from the second external apparatus 400, and generates the input information D2 so that the waveform indicated by the waveform candidate information D5 becomes the waveform indicated by the input information D2. Therefore, even when the amount of information of the correspondence information D4 is reduced, it is possible to generate the input information D2 indicating the waveform suitable for the usage condition of the head unit 110.

Further, as described above, when the input of the waveform candidate information D5 is received, the calculation portion 353 adds information regarding the correspondence relationship between the usage condition indicated by the output information D1 and the waveform indicated by the waveform candidate information D5 to the correspondence information D4 and stores the added information in the storage circuit 340. Therefore, it is possible to optimize the correspondence information D4. By increasing the amount of information in the correspondence information D4 in advance, the calculation portion 353 can generate appropriate input information D2 without using the waveform candidate information D5.

As described above, the output information D1 includes the first output information D1*a* regarding the type of the head unit 110. Therefore, the server 300 can generate the input information D2 indicating the waveform corresponding to the type of the head unit 110.

Further, as described above, the output information D1 includes the second output information D1*b* regarding the type of liquid used for ejection in the head unit 110. Therefore, the server 300 can generate the input information D2 indicating the waveform corresponding to the type of liquid used for ejection in the head unit 110.

Further, as described above, the output information D1 includes the third output information D1*c* regarding the temperature of the head unit 110. Therefore, the server 300 can generate the input information D2 indicating the waveform corresponding to the temperature of the head unit 110.

The server 300 is a cloud server as described above. Therefore, the installation cost can be reduced and the convenience can be improved as compared with the configuration using the on-premises server.

As described above, the processing apparatus 200 includes the processing circuit 250 including one or a plurality of processors, and the processing circuit 250 functions as the first input portion 253 and the first output portion 252. Therefore, the liquid ejecting system 10 includes one or more processors that function as the first input portion 253 and the first output portion 252.

2. Second Embodiment

Hereinafter, a second embodiment of the present disclosure will be described. In the embodiment illustrated below, elements whose actions or functions are similar to those of the first embodiment will be denoted by the same reference numerals used in the description of the first embodiment and detailed description thereof will be omitted as appropriate.

Figure 10:
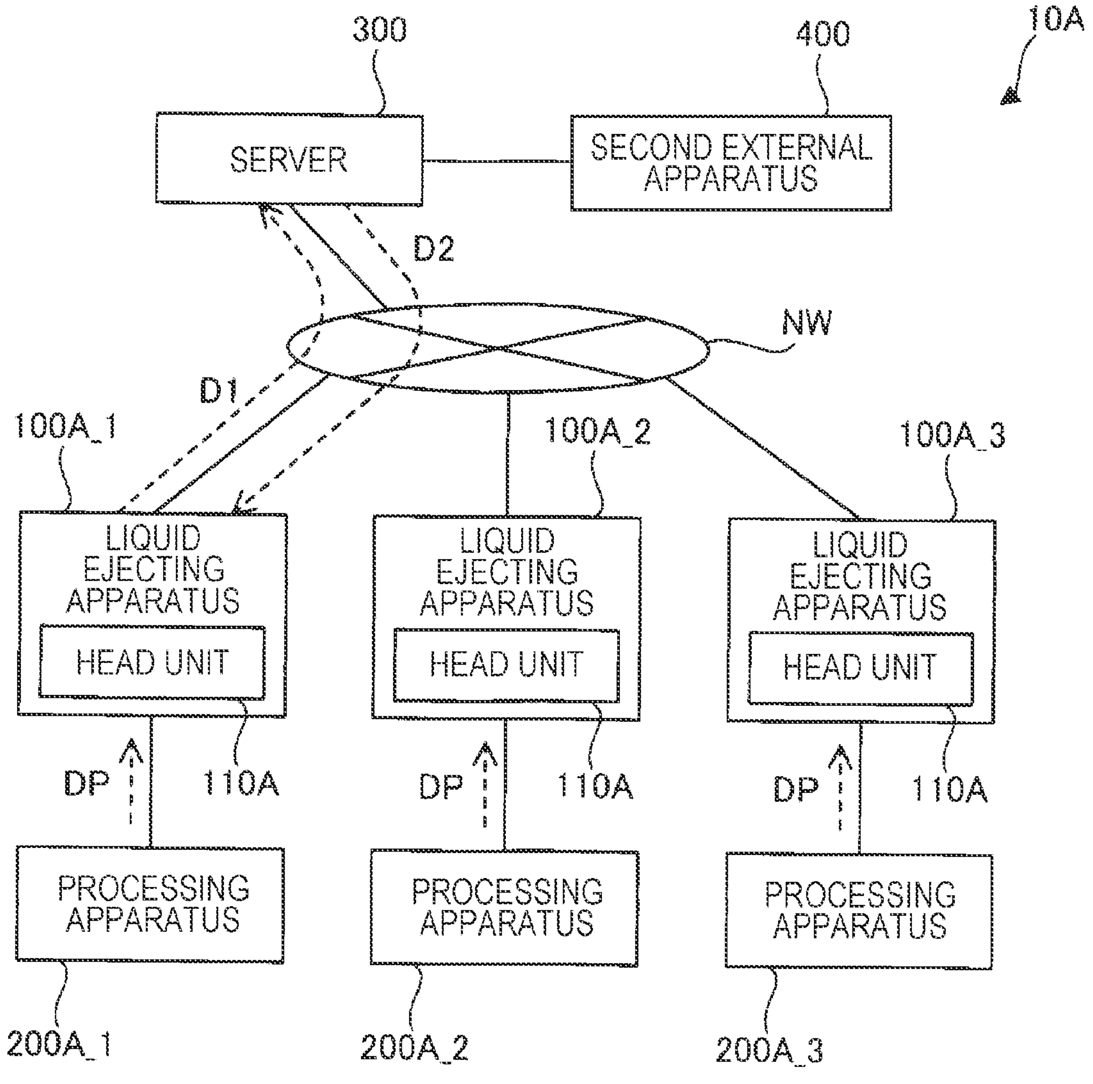
FIG. 10 is a schematic diagram showing a configuration example of a liquid ejecting system according to a second embodiment.

FIG. 10 is a schematic diagram showing a configuration example of a liquid ejecting system 10A according to the second embodiment. The liquid ejecting system 10A has the same configuration as that in the above-described first embodiment except that liquid ejecting apparatuses 100A_1 to 100A_3 and processing apparatuses 200A_1 to 200A_3 are provided in place of the liquid ejecting apparatuses 100_1 to 100_3 and the processing apparatuses 200_1 to 200_3.

The liquid ejecting apparatus 100A_1 is communicably connected to the processing apparatus 200A_1 and is communicably connected to the server 300 through the communication network NW. The liquid ejecting apparatus 100A_2 is communicably connected to the processing apparatus 200A_2 and is communicably connected to the server 300 through the communication network NW. The liquid ejecting apparatus 100A_3 is communicably connected to the processing apparatus 200A_3 and is communicably connected to the server 300 through the communication network NW. As described above, the liquid ejecting apparatuses 100A_1 to 100A_3 correspond to the processing apparatuses 200A_1 to 200A_3, respectively, and are communicably connected to the processing apparatuses 200A_1 to 200A_3, and communicably connected to the server 300 through the communication network NW. In the following, without distinguishing each of the liquid ejecting apparatuses 100A_1 to 100A_3, they may be referred to as the liquid ejecting apparatus 100A. Without distinguishing each of the processing apparatuses 200A_1 to 200A_3, they may be referred to as the processing apparatus 200A.

In the example shown in FIG. 10, the number of each of the liquid ejecting apparatus 100A and the processing apparatus 200A included in the liquid ejecting system 10A is three, but the number is not limited thereto, and the number may be one, two, or four or more. That is, the number of the sets of the liquid ejecting apparatus 100A and the processing apparatus 200A is not limited to three, and may be one, two, or four or more.

The liquid ejecting apparatus 100A is configured in the same manner as the liquid ejecting apparatus 100 of the first embodiment described above, except that a head unit 110A is provided in place of the head unit 110. The head unit 110 is the same as the head unit 110 except that a function of deciding the waveform of a drive pulse PD is added. Details of the liquid ejecting apparatus 100A will be described later with reference to FIG. 11.

The liquid ejecting apparatus 100A outputs output information D1 to the server 300 and inputs input information D2 from the server 300. Then, the liquid ejecting apparatus 100A decides the waveform of the drive pulse based on the input information D2.

The processing apparatus 200A is configured in the same manner as the processing apparatus 200 of the first embodiment described above, except that the function of deciding the waveform of the drive pulse PD is omitted.

Figure 11:
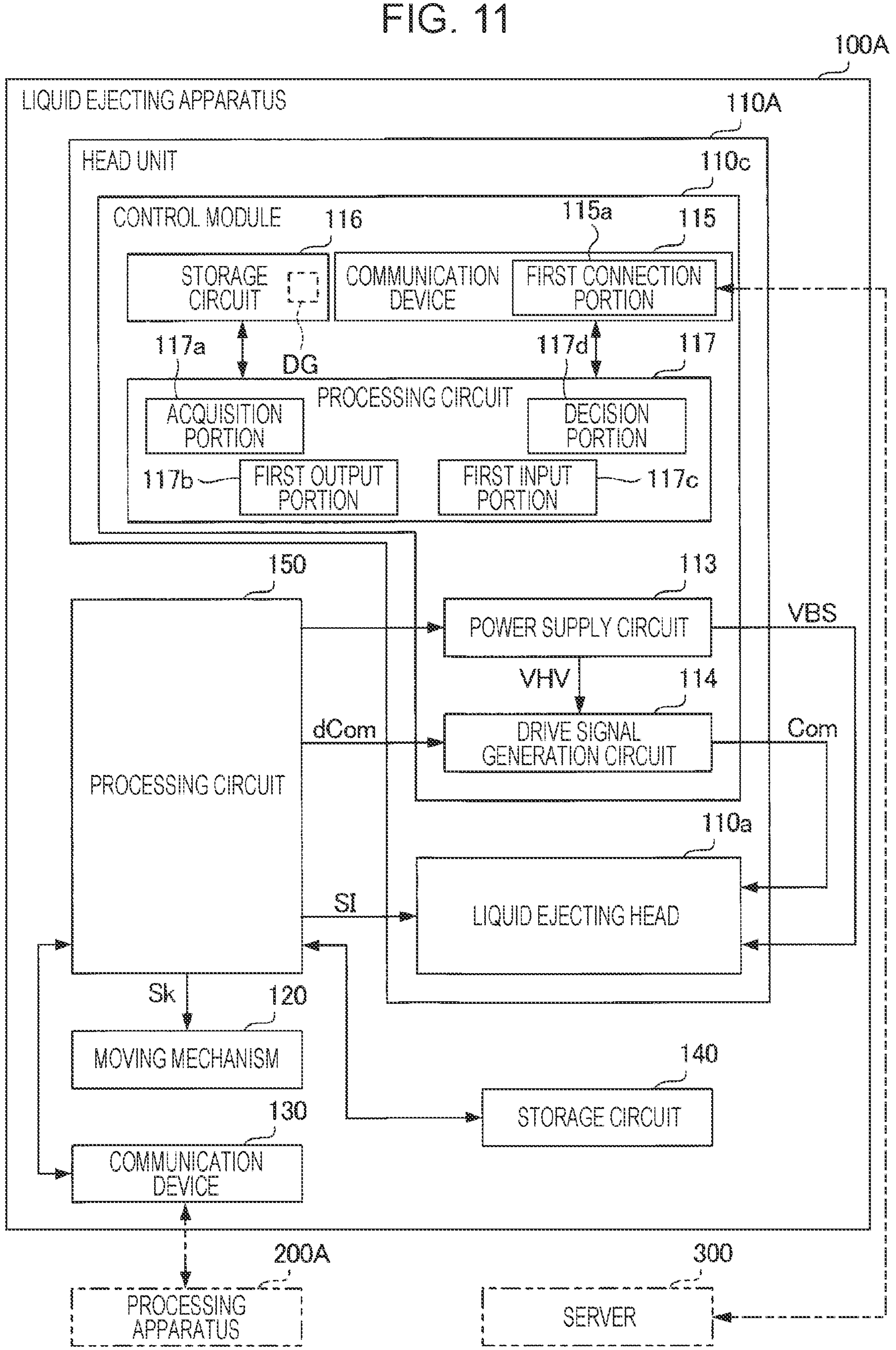
FIG. 11 is a schematic diagram showing a configuration example of a liquid ejecting apparatus used in the liquid ejecting system according to the second embodiment.

FIG. 11 is a schematic diagram showing a configuration example of a liquid ejecting apparatus 100A used in the liquid ejecting system 10A according to the second embodiment. As shown in FIG. 11, the head unit 110A included in the liquid ejecting apparatus 100A is configured in the same manner as the head unit 110 of the first embodiment except that a control module 110*c* is provided in place of the control module 110*b*. The control module 110*c* is configured in the same manner as the control module 110*b* except that a communication device 115, a storage circuit 116, and a processing circuit 117 are added.

The communication device 115 is a circuit capable of communicating with the server 300. For example, the communication device 115 is an interface such as a wireless or wired LAN or USB. The communication device 115 transmits the output information D1 and receives the input information D2 by communicating with the server 300. That is, the communication device 115 functions as the first connection portion 115*a* that is communicably connected to the server 300, as similar to the first connection portion 231 of the first embodiment.

The storage circuit 116 is a device that stores various programs executed by the processing circuit 117 and various data processed by the processing circuit 117. The storage circuit 116 includes, for example, a semiconductor memory.

The storage circuit 116 stores the same information DG as in FIG. 4 described above. That is, the program PG1, the output information D1, the input information D2, and the waveform information D3 are stored in the storage circuit 116.

The processing circuit 117 is a device having a function of controlling each portion of the control module 110*c* and a function of processing various data. The processing circuit 117 has one or more processors such as, for example, a CPU. The processing circuit 117 may be integrally formed with the storage circuit 116, and may be constituted by hardware such as a DSP, an ASIC, a PLD, or an FPGA.

The processing circuit 117 functions as a function FG similar to that of FIG. 4 described above by reading the program PG1 from the storage circuit 116 and executing the program PG1. That is, the processing circuit 117 functions as an acquisition portion 117*a*, a first output portion 117*b*, a first input portion 117*c*, and a decision portion 117*d*.

The acquisition portion 117*a* acquires the output information D1, as similar to the acquisition portion 251 of the first embodiment. The first output portion 117*b* outputs the output information D1 through the first connection portion 115*a*, as similar to the first output portion 252 of the first embodiment. The input information D2 is input to the first input portion 117*c* through the first connection portion 115*a*, as similar to the first input portion 253 of the first embodiment. The decision portion 117*d* decides the waveform of the drive pulse PD based on the input information D2, as similar to the decision portion 254 of the first embodiment.

Figure 12:
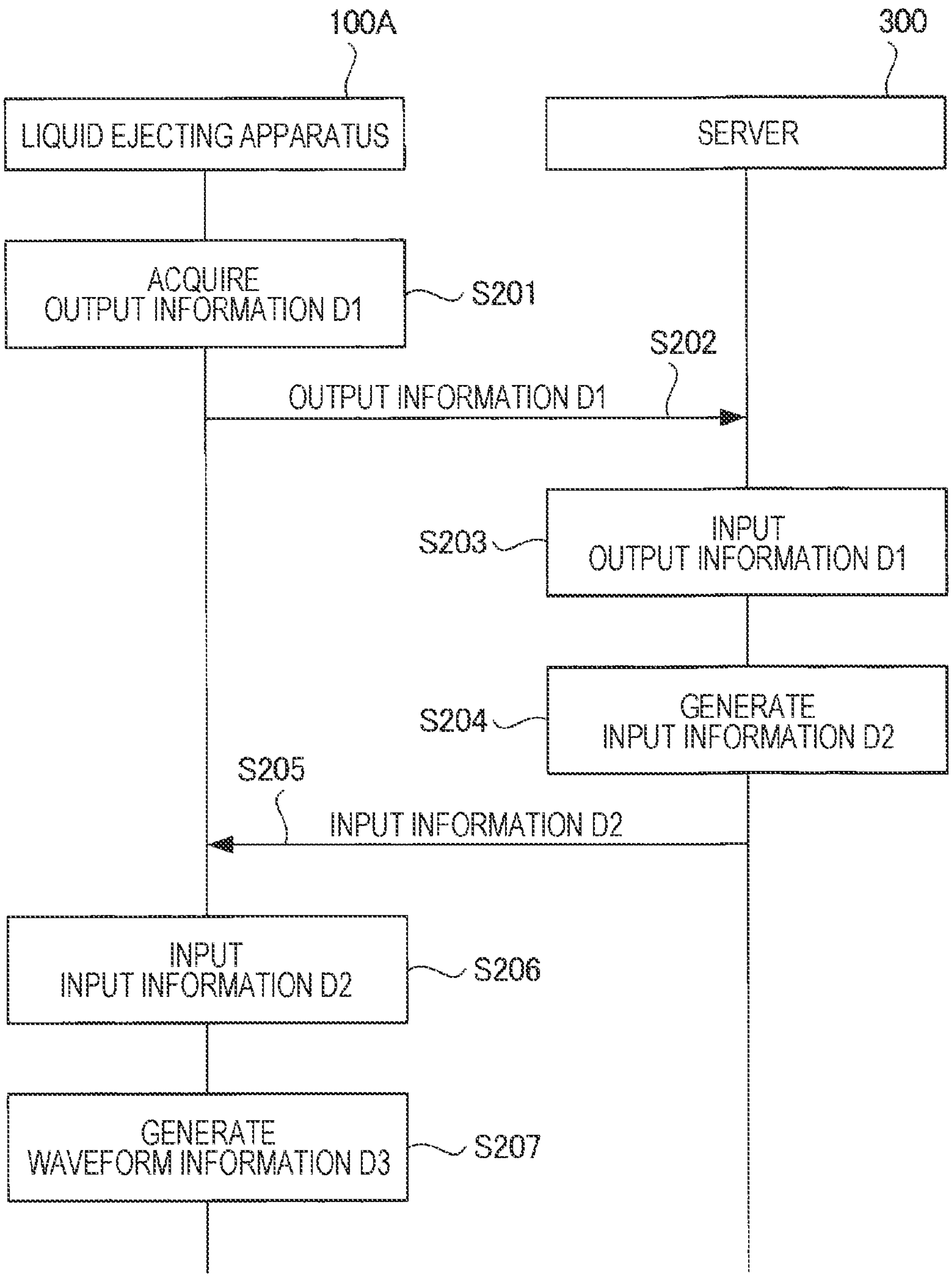
FIG. 12 is a flowchart showing a process of the liquid ejecting system according to the second embodiment.

FIG. 12 is a flowchart showing a process of the liquid ejecting system 10A according to the second embodiment. In the liquid ejecting system 10A, first, as shown in FIG. 12, in step S201, the liquid ejecting apparatus 100A acquires the output information D1. Then, in step S202, the liquid ejecting apparatus 100A outputs the output information D1 to the server 300.

Next, in step S203, the server 300 inputs the output information D1. Then, in step S204, the server 300 generates the input information D2 based on the output information D1. Then, in step S205, the server 300 outputs the input information D2 to the liquid ejecting apparatus 100A.

Next, in step S206, the liquid ejecting apparatus 100A inputs the input information D2. Then, in step S207, the liquid ejecting apparatus 100A generates the waveform information D3 based on the input information D2.

As similar to the first embodiment, in the above second embodiment, even when the manufacturer of the printer main body is different from the manufacturer of the head, it is possible to reduce the burden on the manufacturer or the user of the printer main body and suitably decide the waveform of the drive pulse PD. In the present embodiment, as described above, each of the first input portion 117*c* and the first connection portion 115*a* is provided in the liquid ejecting apparatus 100A. Therefore, it is possible to input the input information D2 from the server 300 to the liquid ejecting apparatus 100A. Therefore, by providing the decision portion 117*d* in the liquid ejecting apparatus 100A, it is possible to use the information regarding the waveform decided by the decision portion 117*d* in the liquid ejecting apparatus 100A. Further, since it is not necessary to incorporate the program for deciding the waveform of the drive pulse PD into the processing apparatus 200A, it is also possible to reduce the burden on the manufacturer or the user of the printer main body in this respect.

3. Third Embodiment

Hereinafter, a third embodiment of the present disclosure will be described. In the embodiment illustrated below, elements whose actions or functions are similar to those of the first embodiment will be denoted by the same reference numerals used in the description of the first embodiment and detailed description thereof will be omitted as appropriate.

Figure 13:
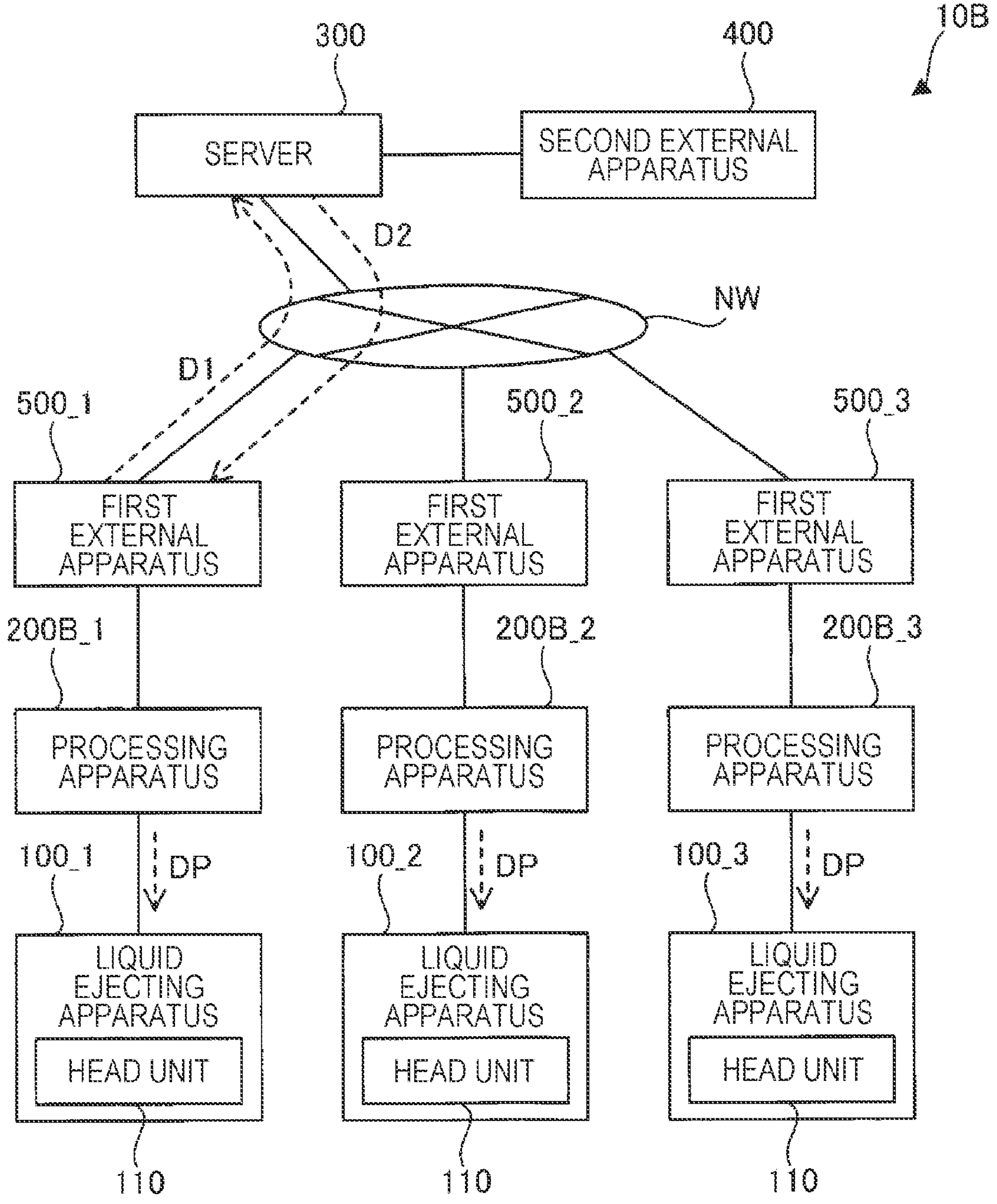
FIG. 13 is a schematic diagram showing a configuration example of a liquid ejecting system according to a third embodiment.

FIG. 13 is a schematic diagram showing a configuration example of a liquid ejecting system 10B according to the third embodiment. The liquid ejecting system 10B is configured in the same manner as that of the above-described first embodiment except that processing apparatuses 200B_1 to 200B_3 are provided in place of the processing apparatuses 200_1 to 200_3 and first external apparatuses 500_1 to 500_3 are added.

The first external apparatus 500_1 is communicably connected to the processing apparatus 200B_1 and is communicably connected to the server 300 through the communication network NW. The first external apparatus 500_2 is communicably connected to the processing apparatus 200B_2 and is communicably connected to the server 300 through the communication network NW. The first external apparatus 500_3 is communicably connected to the processing apparatus 200B_3 and is communicably connected to the server 300 through the communication network NW. As described above, the first external apparatuses 500_1 to 500_3 correspond to the processing apparatuses 200B_1 to 200B_3, respectively, and are communicably connected to the processing apparatuses 200B_1 to 200B_3 and are communicably connected to the server 300 through the communication network NW. In the following, without distinguishing each of the first external apparatuses 500_1 to 500_3, they may be referred to as the first external apparatus 500. Without distinguishing each of the processing apparatuses 200B_1 to 200B_3, they may be referred to as the processing apparatus 200B.

In the example shown in FIG. 13, the number of each of the first external apparatus 500, the liquid ejecting apparatus 100, and the processing apparatus 200B included in the liquid ejecting system 10B is three, but the number is not limited thereto, and the number may be one, two, or four or more. That is, the number of sets of the first external apparatus 500, the liquid ejecting apparatus 100, and the processing apparatus 200B is not limited to three, and may be one, two, or four or more.

The processing apparatus 200B is configured in the same manner as the processing apparatus 200 of the first embodiment, except that it is communicably connected to each of the first external apparatus 500 and the liquid ejecting apparatus 100.

The first external apparatus 500 is a mobile terminal such as a smartphone or a tablet terminal, and is configured to be able to communicate with each of the server 300 and the processing apparatus 200B. The first external apparatus 500 acquires the output information D1, outputs the output information D1 to the server 300, and inputs the input information D2 from the server 300.

The processing apparatus 200B is configured in the same manner as the processing apparatus 200 of the first embodiment. However, among the acquisition portion 251, the first output portion 252, the first input portion 253, and the decision portion 254, the processing apparatus 200B does not use the first output portion 252 and the first input portion 253, and uses the acquisition portion 251 and the decision portion 254. Therefore, in the processing apparatus 200B, one or both of the first output portion 252 and the first input portion 253 may be omitted.

Figure 14:
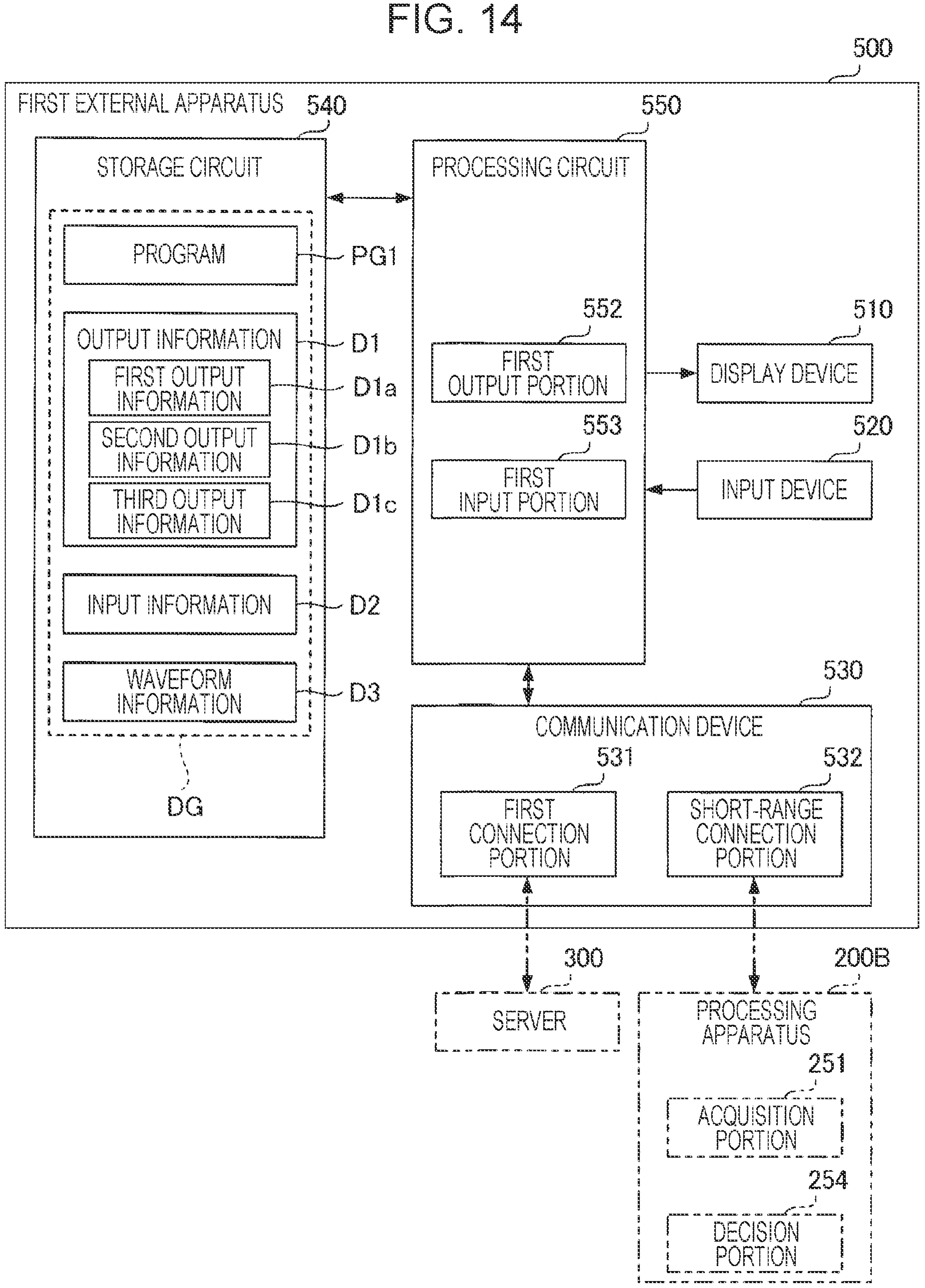
FIG. 14 is a schematic diagram showing a configuration example of a first external apparatus used in the liquid ejecting system according to the third embodiment.

FIG. 14 is a schematic diagram showing a configuration example of the first external apparatus 500 used in the liquid ejecting system 10B according to the third embodiment. The first external apparatus 500 includes a display device 510, an input device 520, a communication device 530, a storage circuit 540, and a processing circuit 550. The components are communicably connected to each other.

The display device 510 displays various images under the control of the processing circuit 550. Here, the display device 510 includes various display panels such as a liquid crystal display panel or an organic electro-luminescence (EL) display panel, for example.

The input device 520 is a device that receives operations from the user. For example, the input device 520 has a pointing device such as a touch panel. Here, when the input device 520 has a touch panel, the input device 520 is integrally formed with the display device 510.

The communication device 530 is a circuit capable of communicating with each of the processing apparatus 200B and the server 300. The communication device 530 is an interface for short-range wireless communication such as Wi-Fi or Bluetooth, wireless or wired LAN, USB, or the like. Wi-Fi and Bluetooth are registered trademarks.

The communication device 530 transmits the output information D1 and receives the input information D2 by communicating with the server 300. That is, the communication device 530 functions as a first connection portion 531 that is communicably connected to the server 300. Further, the communication device 530 functions as a short-range connection portion 532 that is communicably connected to the processing apparatus 200B by short-range wireless communication, and transmits the waveform information D3 to the processing apparatus 200B by the function. The communication device 530 may be integrated with the processing circuit 550.

The storage circuit 540 is a device that stores various programs executed by the processing circuit 550 and various data processed by the processing circuit 550. The storage circuit 540 includes, for example, a semiconductor memory.

The program PG1, the output information D1, the input information D2, and the waveform information D3 are stored in the storage circuit 540 of the present embodiment.

The processing circuit 550 is a device having a function of controlling each portion of the first external apparatus 500 and a function of processing various data. The processing circuit 550 has one or more processors such as, for example, a CPU. Some or all of the functions of the processing circuit 550 may be implemented by hardware such as DSP, ASIC, PLD, and FPGA.

The processing circuit 550 functions as a first output portion 552 and a first input portion 553 by reading the program PG1 from the storage circuit 540 and executing the program PG1. In the present embodiment, the program PG1 stored in the storage circuit 540 does not implement the functions corresponding to the acquisition portion 251 and the decision portion 254 of the first embodiment in the processing circuit 550, but may implement the function corresponding to one or both of the acquisition portion 251 and the decision portion 254 in the processing circuit 550. When the function corresponding to the decision portion 254 is implemented in the processing circuit 550, the waveform of the drive pulse PD may be decided by the first external apparatus 500 instead of the processing apparatus 200B. When the function corresponding to the acquisition portion 251 is implemented in the processing circuit 550, the output information D1 may be acquired by the first external apparatus 500 instead of the processing apparatus 200B.

The first output portion 552 outputs the output information D1 through the first connection portion 531. For example, the first output portion 552 outputs the output information D1 to the server 300 through the first connection portion 531 by using an instruction or the like issued by a user using the input device 520 as a trigger.

The input information D2 is input to the first input portion 553 through the first connection portion 531. For example, the input information D2 is input from the server 300 to the first input portion 553 through the first connection portion 531, by using an instruction or the like issued by the user using the input device 520 as a trigger.

Figure 15:
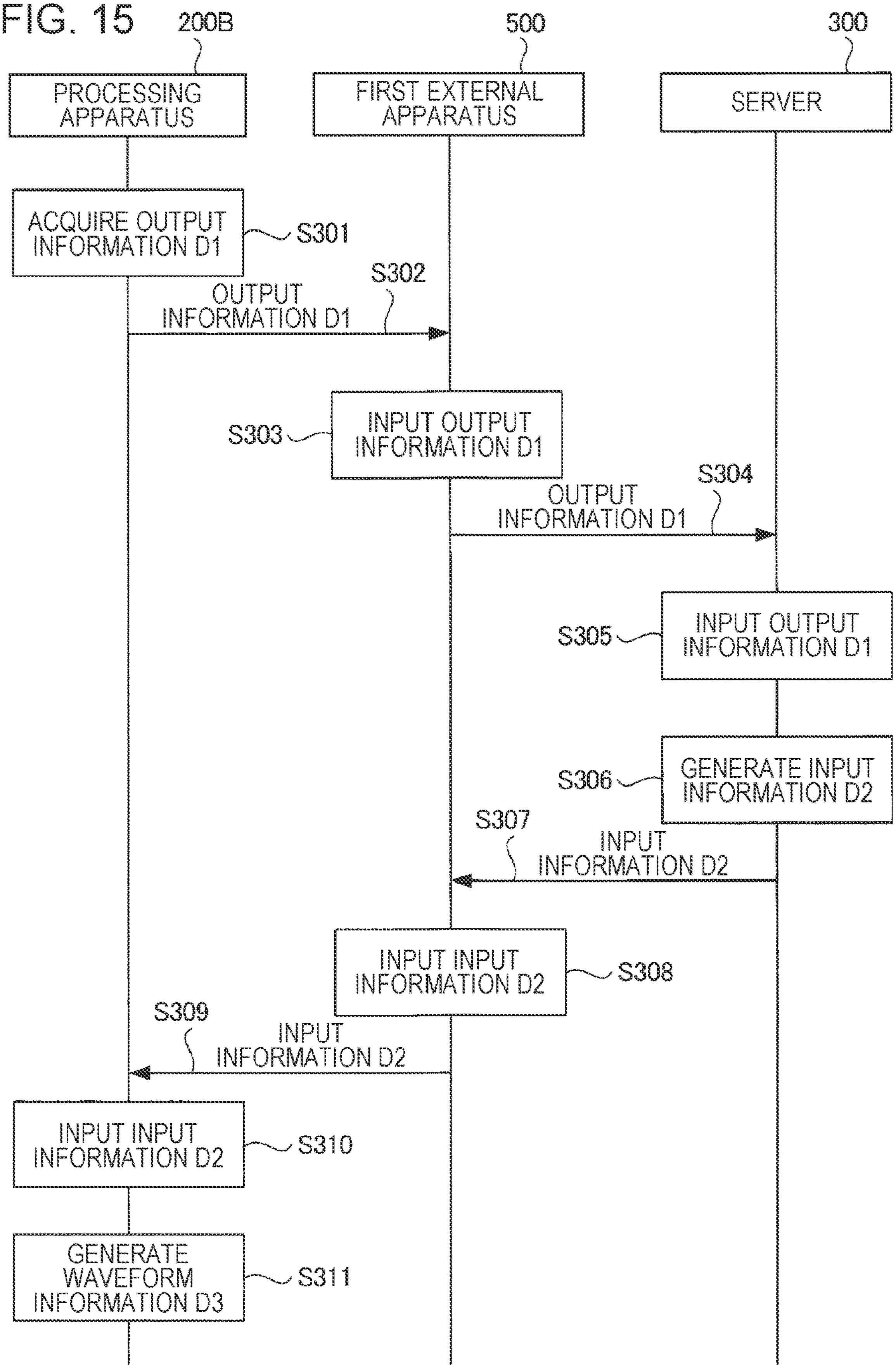
FIG. 15 is a flowchart showing a process of the liquid ejecting system according to the third embodiment.

FIG. 15 is a flowchart showing a process of the liquid ejecting system 10B according to the third embodiment. In the liquid ejecting system 10B, first, as shown in FIG. 15, in step S301, the processing apparatus 200B acquires the output information D1. Then, in step S302, the processing apparatus 200B outputs the output information D1 to the first external apparatus 500.

Next, in step S303, the first external apparatus 500 inputs the output information D1. Then, in step S304, the first external apparatus 500 outputs the output information D1 to the server 300.

Next, in step S305, the server 300 inputs the output information D1. Then, in step S306, the server 300 generates the input information D2 based on the output information D1. Then, in step S307, the server 300 outputs the input information D2 to the first external apparatus 500.

Next, in step S308, the first external apparatus 500 inputs the input information D2. Then, in step S309, the first external apparatus 500 outputs the input information D2 to the processing apparatus 200B.

Next, in step S310, the processing apparatus 200B inputs the input information D2. Then, in step S311, the processing apparatus 200B generates the waveform information D3 based on the input information D2.

As similar to the first embodiment or the second embodiment, in the above third embodiment, even when the manufacturer of the printer main body is different from the manufacturer of the head, it is possible to reduce the burden on the manufacturer or the user of the printer main body and suitably decide the waveform of the drive pulse PD. In the present embodiment, as described above, the liquid ejecting system 10B includes the first external apparatus 500. The first external apparatus 500 is communicably connected to the processing apparatus 200. The first input portion 553 and the first connection portion 531 are provided in the first external apparatus 500. Therefore, the input information D2 from the server 300 can be input to the first external apparatus 500. Further, the decision portion 254 can be provided in the processing apparatus 200B. Then, the information regarding the waveform decided by the decision portion 254 can be input from the processing apparatus 200B to the liquid ejecting apparatus 100. The first external apparatus 500 may be provided with a functional portion corresponding to the decision portion 254, and in this case, information regarding the waveform decided by the functional portion can be input from the first external apparatus 500 to the liquid ejecting apparatus 100 through the processing apparatus 200.

Further, as described above, the processing apparatus 200 and the first external apparatus 500 are communicably connected to each other by short-range wireless communication. Therefore, in a simple communication environment, the input information D2 can be input from the first external apparatus 500 to the processing apparatus 200B. When the first external apparatus 500 is provided with the functional portion corresponding to the decision portion 254, the information regarding the waveform decided by the functional portion can also be input from the first external apparatus 500 to the processing apparatus 200B.

4. Fourth Embodiment

Hereinafter, a fourth embodiment of the present disclosure will be described. In the embodiment illustrated below, elements whose actions or functions are similar to those of the first embodiment will be denoted by the same reference numerals used in the description of the first embodiment and detailed description thereof will be omitted as appropriate.

Figure 16:
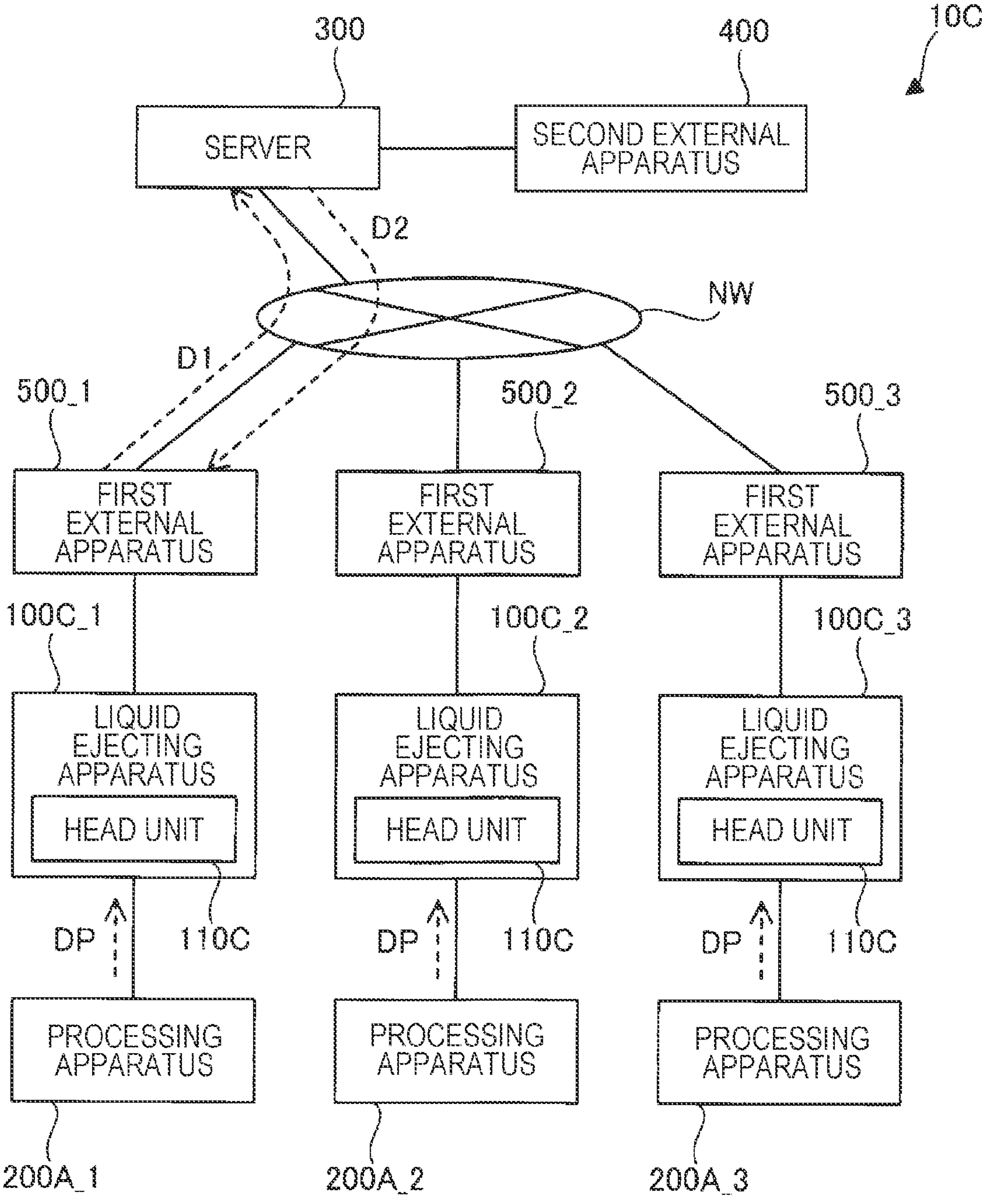
FIG. 16 is a schematic diagram showing a configuration example of a liquid ejecting system according to a fourth embodiment.

FIG. 16 is a schematic diagram showing a configuration example of a liquid ejecting system 10C according to the fourth embodiment. The liquid ejecting system 10C is configured in the same manner as that of the first embodiment described above except that liquid ejecting apparatuses 100C_1 to 100C_3 and processing apparatuses 200A_1 to 200A_3 are provided in place of the liquid ejecting apparatuses 100_1 to 100_3 and the processing apparatuses 200_1 to 200_3, and first external apparatuses 500_1 to 500_3 are added. That is, the liquid ejecting system 10C has the same configuration as that in the above-described third embodiment except that liquid ejecting apparatuses 100C_1 to 100C_3 and processing apparatuses 200A_1 to 200A_3 are provided in place of the liquid ejecting apparatuses 100_1 to 100_3 and the processing apparatuses 200B_1 to 200B_3. The processing apparatus 200A is configured in the same manner as the processing apparatus 200A of the second embodiment.

In the present embodiment, the first external apparatus 500_1 is communicably connected to the liquid ejecting apparatus 100C_1 and is communicably connected to the server 300 through the communication network NW. The first external apparatus 500_2 is communicably connected to the liquid ejecting apparatus 100C_2 and is communicably connected to the server 300 through the communication network NW. The first external apparatus 500_3 is communicably connected to the liquid ejecting apparatus 100C_3 and is communicably connected to the server 300 through the communication network NW. As described above, the first external apparatuses 500_1 to 500_3 correspond to the liquid ejecting apparatuses 100C_1 to 100C_3, respectively, and are communicably connected to the liquid ejecting apparatuses 100C_1 to 100C_3 and communicably connected to the server 300 through the communication network NW. In the following, without distinguishing each of the liquid ejecting apparatuses 100C_1 to 100C_3, they may be referred to as the liquid ejecting apparatus 100C.

In the example shown in FIG. 16, the number of each of the first external apparatus 500, the liquid ejecting apparatus 100C, and the processing apparatus 200A included in the liquid ejecting system 10C is three, but the number is not limited thereto, and the number may be one, two, or four or more. That is, the number of sets of the first external apparatus 500, the liquid ejecting apparatus 100C, and the processing apparatus 200A is not limited to three, and may be one, two, or four or more.

The liquid ejecting apparatus 100C is configured in the same manner as the liquid ejecting apparatus 100A of the second embodiment except that it can communicate with each of the server 300 and the processing apparatus 200A.

Figure 17:
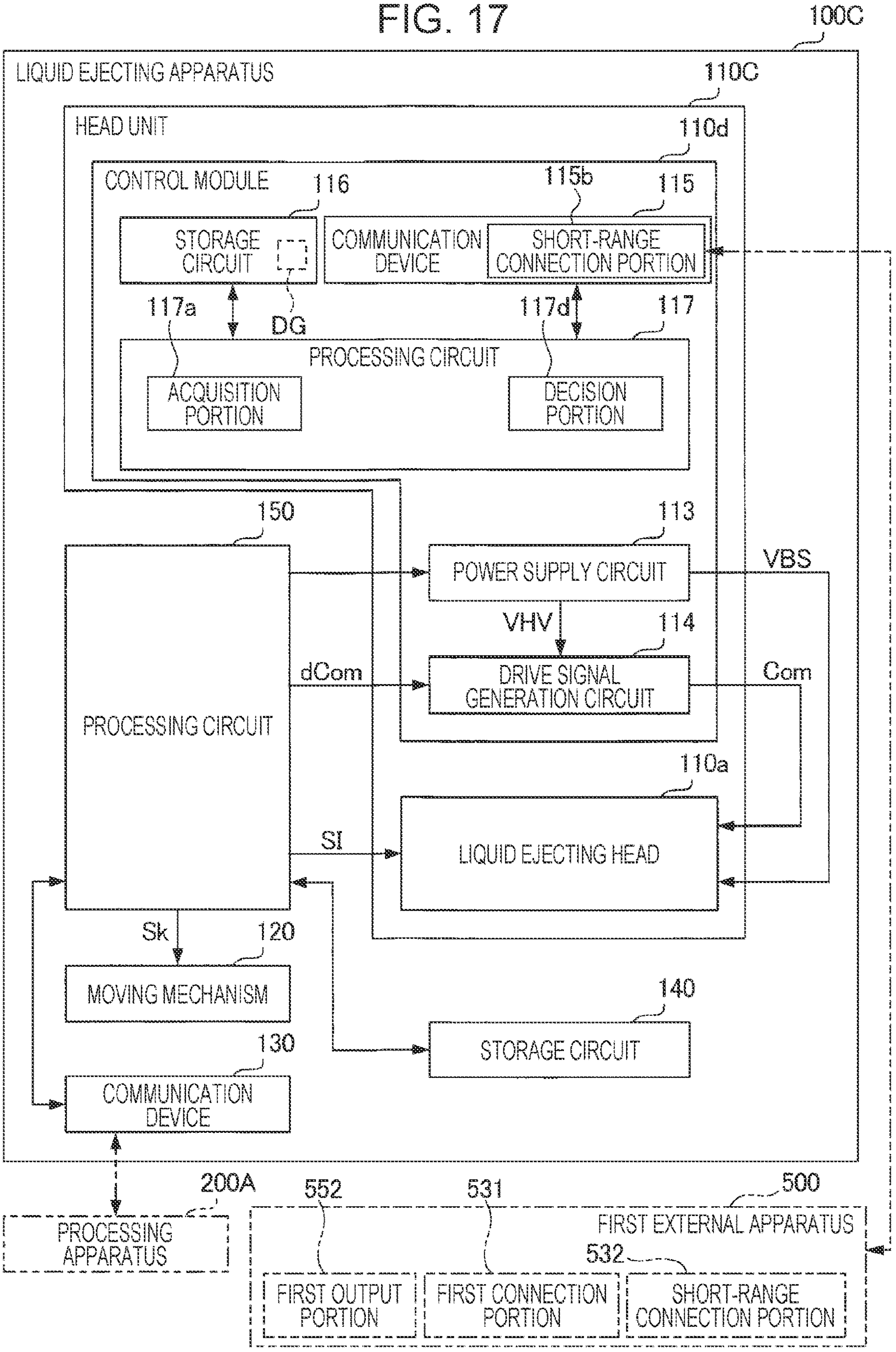
FIG. 17 is a schematic diagram showing a configuration example of a liquid ejecting apparatus used in the liquid ejecting system according to the fourth embodiment.

FIG. 17 is a schematic diagram showing a configuration example of the liquid ejecting apparatus 100C used in the liquid ejecting system 10C according to the fourth embodiment. As shown in FIG. 17, the liquid ejecting apparatus 100C is configured in the same manner as the liquid ejecting apparatus 100A of the second embodiment except that a head unit 110C is provided in place of the head unit 110A. The head unit 110C is configured in the same manner as the head unit 110A except that a control module 110*d* is provided in place of the control module 110*c*. The control module 110*d* is the same as the control module 110*c* except that the communication device 115 functions as a short-range connection portion 115*b* and the processing circuit 117 functions as the acquisition portion 117*a* and the decision portion 117*d*.

In the present embodiment, the communication device 115 is a circuit capable of communicating with the first external apparatus 500. For example, the communication device 115 is an interface for short-range wireless communication such as Wi-Fi or Bluetooth. That is, the communication device 115 functions as the short-range connection portion 115*b* that is communicably connected to the short-range connection portion 532 of the first external apparatus 500 by short-range wireless communication, and outputs the output information D1 to the first external apparatus 500 or inputs the input information D2 from the first external apparatus 500 by the function.

Figure 18:
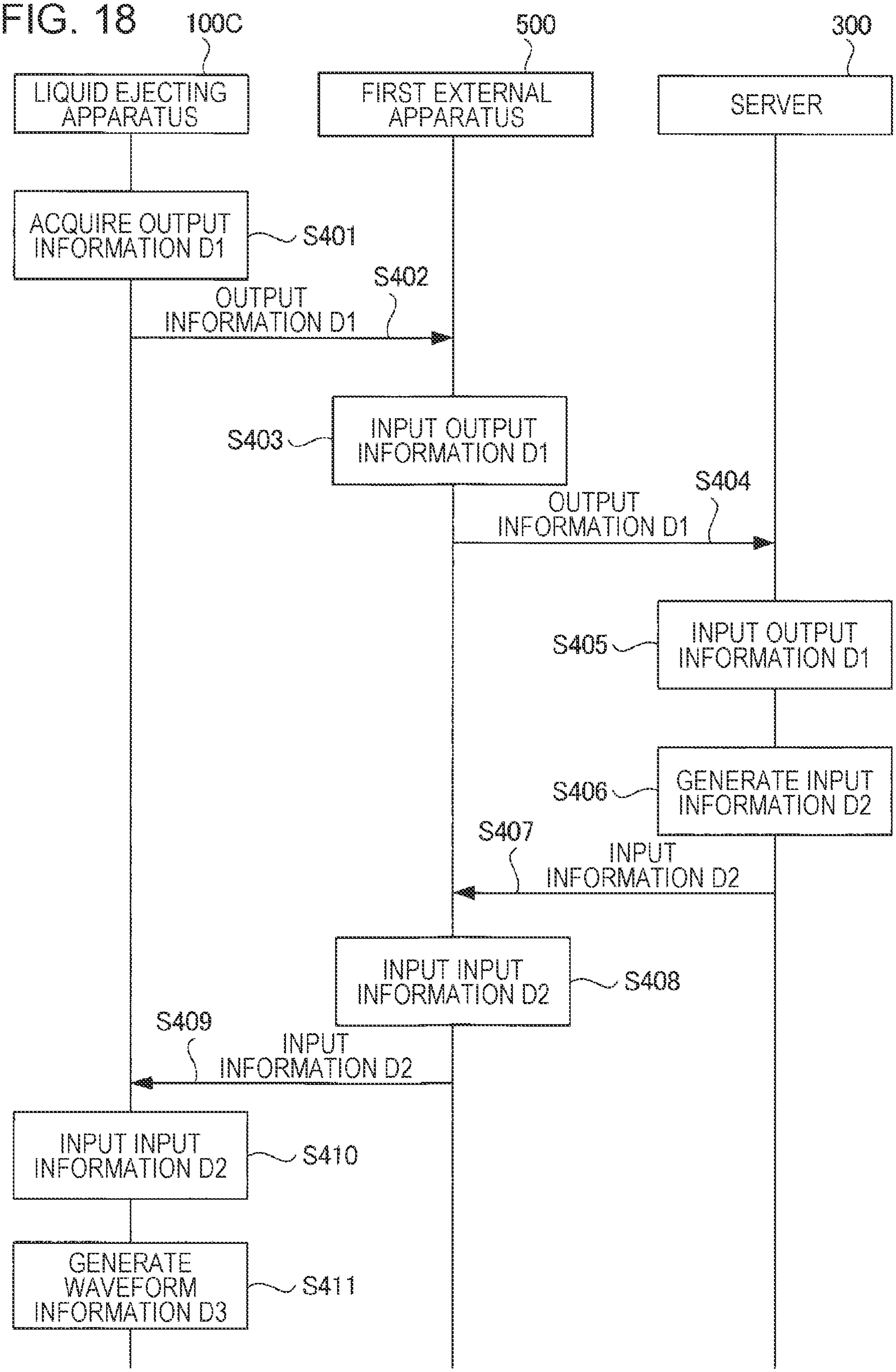
FIG. 18 is a flowchart showing a process of the liquid ejecting system according to the fourth embodiment.

FIG. 18 is a flowchart showing a process of the liquid ejecting system 10C according to the fourth embodiment. In the liquid ejecting system 10C, first, as shown in FIG. 18, in step S401, the liquid ejecting apparatus 100C acquires the output information D1. Then, in step S402, the liquid ejecting apparatus 100C outputs the output information D1 to the first external apparatus 500.

Next, in step S403, the first external apparatus 500 inputs the output information D1. Then, in step S404, the first external apparatus 500 outputs the output information D1 to the server 300.

Next, in step S405, the server 300 inputs the output information D1. Then, in step S406, the server 300 generates the input information D2 based on the output information D1. Then, in step S407, the server 300 outputs the input information D2 to the first external apparatus 500.

Next, in step S408, the first external apparatus 500 inputs the input information D2. Then, in step S409, the first external apparatus 500 outputs the input information D2 to the liquid ejecting apparatus 100C.

Next, in step S410, the liquid ejecting apparatus 100C inputs the input information D2. Then, in step S411, the liquid ejecting apparatus 100C generates the waveform information D3 based on the input information D2.

As similar to the first embodiment to the third embodiment, in the above fourth embodiment, even when the manufacturer of the printer main body is different from the manufacturer of the head, it is possible to reduce the burden on the manufacturer or the user of the printer main body and suitably decide the waveform of the drive pulse PD. In the present embodiment, as described above, the liquid ejecting system 10C includes the first external apparatus 500. The first external apparatus 500 is communicably connected to the liquid ejecting apparatus 100. The first input portion 553 and the first connection portion 531 are provided in the first external apparatus 500. Therefore, the input information D2 from the server 300 can be input to the first external apparatus 500. Further, the liquid ejecting apparatus 100C can be provided with the decision portion 117*d*. Then, the information regarding the waveform decided by the decision portion 117*d* can be used in the liquid ejecting apparatus 100. The first external apparatus 500 may be provided with a functional portion corresponding to the decision portion 117*d*, and in this case, information regarding the waveform decided by the functional portion can be input from the first external apparatus 500 to the liquid ejecting apparatus 100.

Further, as described above, the liquid ejecting apparatus 100 and the first external apparatus 500 are communicably connected to each other by short-range wireless communication. Therefore, by providing the decision portion 254 in the first external apparatus 500, it is possible to input the information regarding the waveform decided by the decision portion 254 from the first external apparatus 500 to the liquid ejecting apparatus 100C. Further, in a simple communication environment, the output information D1 can be output from the liquid ejecting apparatus 100C to the first external apparatus 500, or the input information D2 from the first external apparatus 500 can be input to the liquid ejecting apparatus 100C. When the first external apparatus 500 is provided with the functional portion corresponding to the decision portion 254, the information regarding the waveform decided by the functional portion can also be input from the first external apparatus 500 to the liquid ejecting apparatus 100C.

5. Modification Examples

The liquid ejecting system of the present disclosure has been described above based on the illustrated embodiments, but the present disclosure is not limited thereto. Further, the configuration of each portion of the present disclosure can be replaced with any configuration that exhibits the same functions as that of the above-described embodiments, or any configuration can be added.

5-1. Modification Example 1

In the above-described embodiments, the case where the output information D1 includes the first output information D1*a*, the second output information D1*b*, and the third output information D1*c* is exemplified, but the present disclosure is not limited thereto. For example, one or two of the first output information D1*a*, the second output information D1*b*, and the third output information D1*c* may be omitted. Further, the output information D1 may include information different from the first output information D1*a*, the second output information D1*b*, and the third output information D1*c*.

5-2. Modification Example 2

In the above-described embodiments, the configuration in which the server 300 is a cloud server is exemplified, but the configuration is not limited thereto. For example, the server 300 may be a server other than a cloud server or a virtual server, or may be an on-premises server.

5-3. Modification Example 3

In the above-described embodiments, the configuration in which the drive element 111*f* is a piezoelectric element is exemplified, but the configuration is not limited thereto, and for example, the drive element 111*f* may be a heater that heats ink in the pressure chamber C. That is, the drive method of the head chip 111 is not limited to the piezoelectric method, and may be, for example, a thermal method.

What is claimed is:

1. A liquid ejecting system comprising:

a head unit that includes a nozzle for ejecting a liquid, a pressure chamber communicating with the nozzle, and a drive element for applying pressure fluctuation to a liquid in the pressure chamber by supplying a drive pulse;

an acquisition portion that acquires output information regarding a usage condition of the head unit;

a first connection portion that is communicably connected to a server through a network;

a first output portion that outputs the output information through the first connection portion;

a first input portion to which input information regarding a waveform of the drive pulse supplied to the drive element is input through the first connection portion; and a decision portion that decides the waveform of the drive pulse supplied to the drive element based on the input information.

2. The liquid ejecting system according to claim 1, further comprising:

a liquid ejecting apparatus that includes the head unit;

a processing apparatus that is communicably connected to the liquid ejecting apparatus and generates recorded data used in the liquid ejecting apparatus; and the server.

3. The liquid ejecting system according to claim 2, wherein each of the first input portion and the first connection portion is provided in the processing apparatus.

4. The liquid ejecting system according to claim 2, wherein each of the first input portion and the first connection portion is provided in the liquid ejecting apparatus.

5. The liquid ejecting system according to claim 2, further comprising a first external apparatus that is communicably connected to the processing apparatus, wherein the first input portion and the first connection portion are provided in the first external apparatus.

6. The liquid ejecting system according to claim 5, wherein the processing apparatus and the first external apparatus are communicably connected to each other by short-range wireless communication.

7. The liquid ejecting system according to claim 2, further comprising a first external apparatus that is communicably connected to the liquid ejecting apparatus, wherein the first input portion and the first connection portion are provided in the first external apparatus.

8. The liquid ejecting system according to claim 7, wherein the liquid ejecting apparatus and the first external apparatus are communicably connected to each other by short-range wireless communication.

9. The liquid ejecting system according to claim 2, wherein the server includes a second connection portion that is communicably connected to the first connection portion, a second input portion to which the output information is input through the second connection portion, a second output portion that outputs the input information through the second connection portion, and a calculation portion that performs a calculation for generating the input information based on the output information.

10. The liquid ejecting system according to claim 9, wherein the server further includes a storage portion that stores correspondence information regarding a correspondence relationship between usage conditions of the head unit and waveforms of a drive pulse to be supplied to the drive element, and the calculation portion generates the input information based on the output information and the correspondence information.

11. The liquid ejecting system according to claim 10, wherein when the usage condition indicated by the output information is included in the usage conditions indicated by the correspondence information, the calculation portion generates the input information so that among the usage conditions indicated by the correspondence information, a waveform corresponding to a usage condition matching the usage condition indicated by the output information becomes a waveform indicated by the input information.

12. The liquid ejecting system according to claim 10, wherein when the usage condition indicated by the output information is not included in the usage conditions indicated by the correspondence information, the calculation portion generates the input information so that among the usage conditions indicated by the correspondence information, a waveform corresponding to a usage condition closest to the usage condition indicated by the output information becomes a waveform indicated by the input information.

13. The liquid ejecting system according to claim 10, wherein when the usage condition indicated by the output information is not included in the usage conditions indicated by the correspondence information, the calculation portion outputs the output information to a second external apparatus, receives input of waveform candidate information regarding waveform candidates from the second external apparatus, and generates the input information so that a waveform indicated by the waveform candidate information becomes a waveform indicated by the input information.

14. The liquid ejecting system according to claim 13, wherein when the input of the waveform candidate information is received, the calculation portion adds information regarding a correspondence relationship between the usage condition indicated by the output information and the waveform indicated by the waveform candidate information to the correspondence information and stores the added information in the storage portion.

15. The liquid ejecting system according to claim 1, wherein the output information includes first output information regarding a type of the head unit.

16. The liquid ejecting system according to claim 1, wherein the output information includes second output information regarding a type of liquid used for ejection in the head unit.

17. The liquid ejecting system according to claim 1, wherein the output information includes third output information regarding a temperature of the head unit.

18. The liquid ejecting system according to claim 1, wherein the server is a cloud server.

19. The liquid ejecting system according to claim 1, further comprising one or more processors that function as the first input portion and the first output portion.

* * * * *